(12) United States Patent
Jayakumar et al.

(10) Patent No.: US 10,965,558 B2
(45) Date of Patent: Mar. 30, 2021

(54) METHOD AND SYSTEM FOR EFFECTIVE DATA COLLECTION, AGGREGATION, AND ANALYSIS IN DISTRIBUTED HETEROGENEOUS COMMUNICATION NETWORK

(71) Applicant: Wipro Limited, Bangalore (IN)

(72) Inventors: Dhebeha Jayakumar, Neyveli (IN); Vignesh Karunakaran, Kanchipuram (IN); Swaminathan Seetharaman, Chennai (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 16/439,348

(22) Filed: Jun. 12, 2019

(65) Prior Publication Data

US 2020/0313985 A1 Oct. 1, 2020

(30) Foreign Application Priority Data

Mar. 30, 2019 (IN) .............................. 201941012899

(51) Int. Cl.
   *H04L 12/26* (2006.01)
(52) U.S. Cl.
   CPC .................................... *H04L 43/04* (2013.01)
(58) Field of Classification Search
   CPC . H04L 41/0806; H04L 41/0893; H04L 41/12; H04L 41/5009; H04L 43/04; H04L 45/306; H04L 45/64; H04W 36/14; H04W 48/18; H04W 84/20; H04W 88/16; H04W 8/082
   See application file for complete search history.

(56) References Cited

U.S. PATENT DOCUMENTS

2018/0376338 A1* 12/2018 Ashrafi ............... H04L 41/0806
2019/0190785 A1*  6/2019 Power ................... H04L 47/762
(Continued)

OTHER PUBLICATIONS

ETSI GS NFV-MAN 001, "NFV Management and Orchestration" (2014).
(Continued)

*Primary Examiner* — Minh Trang T Nguyen
(74) *Attorney, Agent, or Firm* — Finnegan, Henderson, Farabow, Garrett & Dunner, LLP

(57) ABSTRACT

This disclosure relates to methods and systems for effective data collection, aggregation, and analysis in a distributed heterogeneous communication network for effective fault detection or performance anomaly detection. In one embodiment, the method may include determining impact characteristics with respect to a network slice or a service in the distributed heterogeneous communication network. The method may further include determining one or more collection nodes, one or more aggregation nodes, and one or more analysis nodes within the distributed heterogeneous communication network based on the impact characteristics. The method may further include activating the one or more collection nodes for collecting data, the one or more aggregation nodes for aggregating the collected data, and the one or more analysis nodes for analyzing the aggregated data. The impact characteristics may include at least one of: user characteristics, service characteristics, slice characteristics, network characteristics, or performance characteristics.

18 Claims, 8 Drawing Sheets

(56) References Cited

U.S. PATENT DOCUMENTS

2019/0208404 A1* 7/2019 Georgiev ................ H04L 67/16
2019/0356559 A1* 11/2019 Kern ..................... H04L 45/306
2020/0067831 A1* 2/2020 Spraggins ............. H04L 45/306
2020/0204452 A1* 6/2020 Bhat ....................... H04L 41/14

OTHER PUBLICATIONS

Sotelo Monge MA, Maestre Vidal J, Garcia Villalba LJ, "Reasoning and Knowledge Acquisition Framework for 5G Network Analytics", Sensors (Basel, Switzerland). 2017;17(10)2405. doi:10.3390/s17102405.

Valdivieso Caraguay ÁL, García Villalba LJ., "Monitoring and Discovery for Self-Organized Network Management in Virtualized and Software Defined Networks" Passaro VMN, ed. Sensors (Basel, Switzerland). 2017;17(4)731. doi:10.3390/s17040731.

Sara Ayoubi et al, "Machine Learning for Cognitive Network Management", IEEE Communications Magazine, 2018.

* cited by examiner

METHOD AND SYSTEM FOR EFFECTIVE DATA COLLECTION, AGGREGATION, AND ANALYSIS IN DISTRIBUTED HETEROGENEOUS COMMUNICATION NETWORK

This application claims the benefit of Indian Patent Application Serial No. 201941012899 filed Mar. 30, 2019, which is hereby incorporated by reference in its entirety.

FIELD

This disclosure relates generally to communication network, and more particularly to a system and method for effective data collection, aggregation, and analysis in a distributed heterogeneous communication network.

BACKGROUND

Various modes of telecommunication have not only revolutionized the way we communicate, but have also changed the way we do business or the way we live our lives. Today, various modes of telecommunication are increasingly used to perform various functions such as streaming multimedia content, playing high definition online games, enabling video calls, and so forth in addition to basic voice calls. As communication networks evolve and rapidly grow in size, heterogeneity, and complexity, it is important for an operator to effectively deliver services and maintain service level agreement (SLA) as it may have a direct impact on the revenues and customer loyalty in a competitive environment. Further, the operator's objective is to deliver service and maintain SLA with optimal overheads and minimum manual intervention, as it may greatly help in bringing down the operational expense (OPEX).

As will be appreciated, effective service delivery and maintenance of SLA may require fault recovery, scaling up/down of network resources, re-allocating resources allocated to a service, ensuring availability of required amount of redundant resources, and so forth. Typically, these actions are the responsibility of service orchestration. Existing techniques may typically require collection of monitoring data (fault data, performance data, configuration data, etc.), transmission of the collected data to network elements (NEs) where the analysis of the data may be performed, and analysis of the collected data for monitoring service key performance indicator (KPI) compliance and overall network performance. However, network monitoring data may be huge in size within a monitoring time-window. Collection of such data from an inappropriate source may lead to delays in transmission and aggregation. Additionally, transmission of such huge amount of collected data for processing to different target NEs is likely to cause network overhead. Further, processing of collected data at different NEs based on the (dynamic) need may lead to delay in overall processing and overall decision making, apart from network overheads. These issues may hamper effective and timely detection network fault(s) or external issues like load, congestion, new service rollouts, etc. that contributes to deviation from service SLA.

Some of the existing techniques provide for fault determination by an aggregation-sub-layer which compiles the collected data into aggregated monitoring data bundles (ADBs). The ADBs may be then used further for discovering of facts (presence of fault) and inferences (resolution). However, ADB definitions are preconfigured and, hence, the place of data aggregation and nature of data aggregation are static. During dynamic network conditions (e.g., network congestion, network overload, etc.) and dynamic user conditions (e.g., high mobility, change of access network type, change of device, etc.), the monitoring data collection requirement may vary for effective fault-monitoring. In such a scenario, static mode of data collection and aggregation may fail to work.

Some of the existing techniques provide for static mode of collection of monitoring data from different sources, and storage of the collected monitoring data in a monitoring and discovery database (MDB). The aggregation process may be carried out on the collected monitoring data from the MDB, which includes normalization, removal of redundant information, etc. based on static rules. After aggregation, only relevant information is taken up for further analysis related to prediction of future network problems. The analysis is based on static rules and procedures. However, static mode of data collection, aggregation and analysis may fail to work under dynamic network and user conditions, which would hamper effective detection of service disruption or service KPI degradation.

Some of the existing techniques provide for a mechanism of cognitive network management in which the cognitive network monitor (C-Monitor) performs intelligent probing, for e.g., when the network is overloaded, the C-Monitor may decide to reduce the frequency of monitoring data collection and perform regression for extrapolation of monitoring data which got missed out during the intervals. Again, such techniques involve a static rule-based monitoring and data aggregation, and rule-based processing at a pre-defined granularity and sequence. However, during dynamic network conditions (congestion, overload, etc.) and dynamic user conditions (e.g., high mobility, change of access network type, change of device, etc.), the monitoring data aggregation and analysis requirement may vary for effective performance and fault-monitoring. Thus, such a static mechanism may not be effective for detection of service disruption or service KPI degradation.

In short, existing techniques are limited in their scope and utility for effective and timely (proactive) detection and resolution of fault and performance anomaly, for SLA maintenance. In particular, existing techniques are limited by sub-optimal collection of data from an inappropriate source, inappropriate aggregation of collected monitoring data at an inappropriate place (particularly, under dynamic network and user conditions), and failure to perform an appropriate analysis of the monitoring data.

SUMMARY

In one embodiment, a method for collecting, aggregating, and analyzing data in a distributed heterogeneous communication network is disclosed. In one example, the method may include determining impact characteristics with respect to a network slice or a service in the distributed heterogeneous communication network. The impact characteristics may include at least one of: user characteristics, service characteristics, slice characteristics, network characteristics, or performance characteristics. The method may further include determining one or more collection nodes, one or more aggregation nodes, and one or more analysis nodes within the distributed heterogeneous communication network based on the impact characteristics. The method may further include activating the one or more collection nodes for collecting data, the one or more aggregation nodes for aggregating the collected data, and the one or more analysis nodes for analyzing the aggregated data.

In one embodiment, a system for collecting, aggregating, and analyzing data in a distributed heterogeneous communication network is disclosed. In one example, the system may include an end-to-end orchestration (E2EO) device, which in turn may include at least one processor configured to execute a set of instructions for determining impact characteristics with respect to a network slice or a service in the distributed heterogeneous communication network. The impact characteristics may include at least one of: user characteristics, service characteristics, slice characteristics, network characteristics, or performance characteristics. The at least one processor may be further configured for determining determine one or more collection nodes, one or more aggregation nodes, and one or more analysis nodes within the distributed heterogeneous communication network based on the impact characteristics. The at least one processor may be further configured for activating the one or more collection nodes for collecting data, the one or more aggregation nodes for aggregating the collected data, and the one or more analysis nodes for analyzing the aggregated data. The E2EO device may further include at least one computer-readable medium that stores the set of instructions, configuration data, collected data, aggregated data, and analyzed data.

In one embodiment, a non-transitory computer-readable medium storing computer-executable instructions for collecting, aggregating, and analyzing data in a distributed heterogeneous communication network is disclosed. In one example, the stored instructions, when executed by a processor, may cause the processor to perform operations comprising determining impact characteristics with respect to a network slice or a service in the distributed heterogeneous communication network. The impact characteristics may include at least one of: user characteristics, service characteristics, slice characteristics, network characteristics, or performance characteristics. The operations may further include determining one or more collection nodes, one or more aggregation nodes, and one or more analysis nodes within the distributed heterogeneous communication network based on the impact characteristics. The operations may further include activating the one or more collection nodes for collecting data, the one or more aggregation nodes for aggregating the collected data, and the one or more analysis nodes for analyzing the aggregated data.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1A:
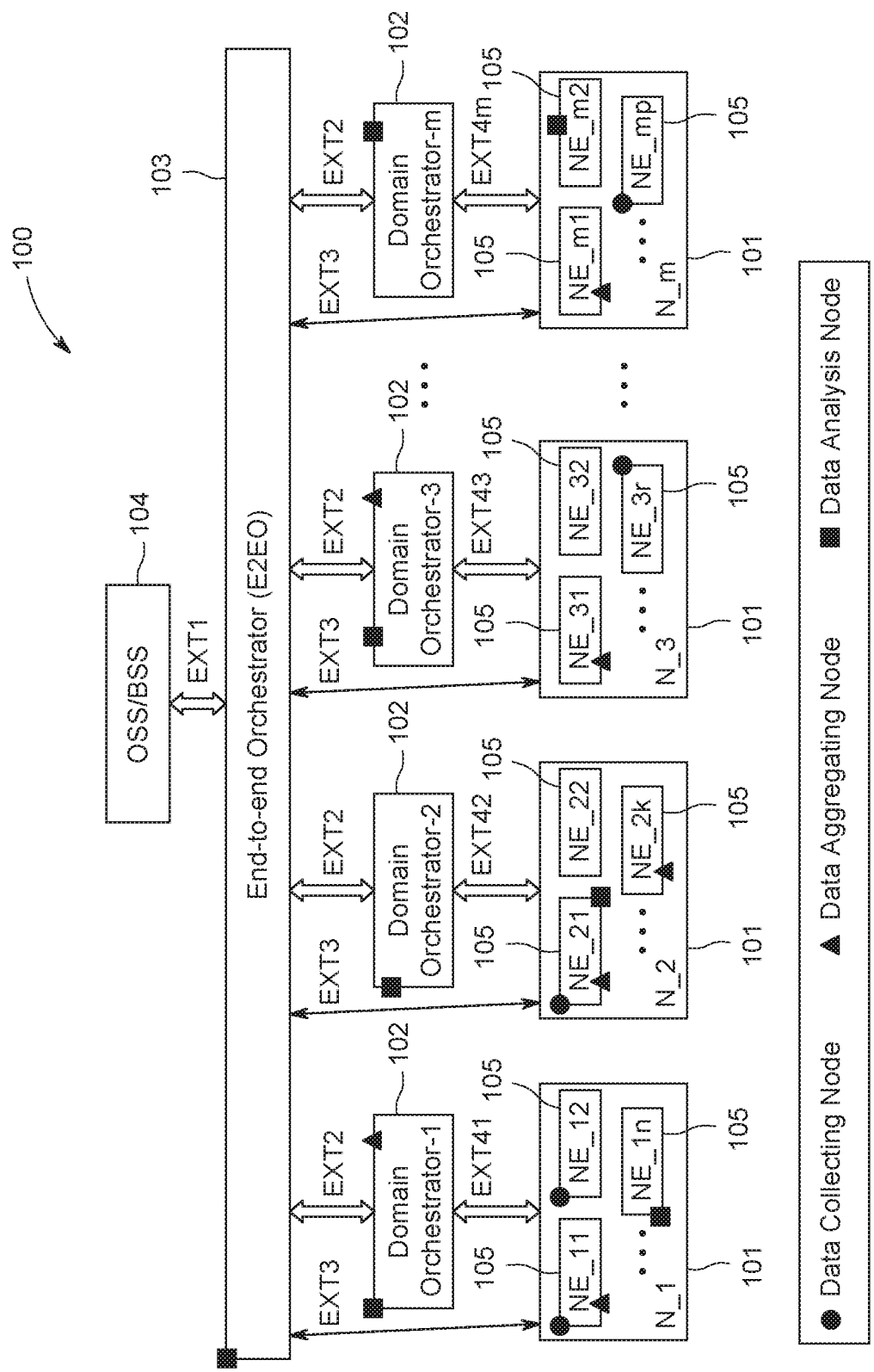
FIG. 1A illustrates an exemplary distributed heterogeneous communication network in which various embodiments of the present disclosure may function.

Referring now to FIG. 1A, an exemplary distributed heterogeneous communication network 100 in which various embodiments of the present disclosure may function, is illustrated. The distributed heterogeneous communication network 100 (also referred to as communication network 100 for the sake of brevity) may be employed by an operator or a service provider so as to deliver services to end-customers. The communication network 100 may include several network segments 101 (also referred to as network subnets 101) and several domain orchestration (DOM-ORCH) devices 102 (also referred to as domain orchestrators (DOM-ORCH) 102). Additionally, the communication network 100 may include an end-to-end orchestration (E2EO) device 103 (also referred to as end-to-end orchestrator (E2EO) 103). As will be described in greater detail in conjunction with FIGS. 2-5, the E2EO device 103 may perform effective data collection, aggregation, and analysis in the communication network 100, in accordance with some embodiments of the present disclosure. Further, the communication network 100 may include an operations support system (OSS) 104 or business support system (BSS) 104.

The network segments 101 may include, but may not be limited to, a wireless access network (e.g., 4G, 5G, etc.), a fiber/optical backhaul, a packet core network, an Internet protocol (IP) network, multiprotocol label switching (MPLS) network, and so forth. Each of the network segments 101 (say, N_s) may further include a number of network elements (i.e., NE_s1, NE_s2 . . . ) 105. For example, in the illustrated embodiment, network segment N_1 may include network elements NE_11, NE_12 . . . NE 1*n*, network segment N_2 may include network elements NE_21, NE_22 . . . NE_2*k*, network segment N_3 may include network elements NE_31, NE_32 . . . NE_3*r*, and network segment N_m may include network elements NE_m1, NE_m2 . . . NE_mp. As will be described in greater detail in conjunction with FIG. 1B or FIG. 1C, in presence of network slicing, each of the network elements 105 for a given network segment 101 may be a part of different network slices (also referred to as slice subnets or network slice subnets).

Typically, a domain orchestration device 102 may be a network-segment orchestrator (e.g., a core network orchestrator, a software defined networking (SDN) orchestrator, a radio access network (RAN) orchestrator, etc.) configured to perform orchestration of a network segment 101. Thus, in the illustrated embodiment, each of the domain orchestration devices 102 (i.e., domain orchestrator—1, domain orchestrator—2, domain orchestrator—3 . . . domain orchestrator—m) are shown to interact with each of the network segments 101 (i.e., N_1, N_2, N_3 . . . N_m). In the presence of network slicing, there may be one domain orchestration device 102 per slice subnet instead of one domain orchestration device 102 per network segment 101. In other words, there may be 'n' domain orchestration devices 102 for network segment 101, if there are 'n' slice subnets of a network segment 101.

The OSS/BSS 104 may be communicatively coupled to the E2EO device 103 via an interface EXT1. The interface EXT1 may employ any standard protocol (e.g., http, REST, RESTCONF, SNMP, etc.) or any other proprietary protocol. Additionally, the E2EO device 103 may be communicatively coupled to the domain orchestration devices 102, via an interface EXT2. It should be noted that, in some embodiments, each of the domain orchestration devices 102 may employ a different protocol to interact with the E2EO device 103. In such embodiments, the interface EXT2 may be represented as multiple different interfaces EXT21, EXT22 . . . EXT2*m*. The interface EXT2 interface (or each of the interfaces EXT21, EXT22 . . . EXT2*m*) may employ any standard protocol (e.g., http, REST, SNMP, netconf/yang, etc.) or any other proprietary protocol. Further, the E2EO device 103 may be communicatively coupled to the network elements 105 in the network segments 101, via an interface EXT3 primarily for reporting of fault/performance data from the network elements 105. Again, it should be noted that, in some embodiments, each of the network segments 101 (in fact, each of the network elements 105) may employ a different protocol to interact with the E2EO device 103. In such embodiments, the interface EXT3 interface may be represented as multiple different interfaces EXT31, EXT32 . . . EXT3*m*. The interface EXT3 (or each of the interfaces EXT31, EXT32 . . . EXT3*m*) may employ any standard protocol (e.g., REST/RESTCONF, netconf/yang, etc.) or any other proprietary protocol. Moreover, each of the domain orchestration devices 102 may be communicatively coupled to the network elements 105 in the network segments 101, via interfaces EXT41 to EXT4*m* respectively, so as to configure the network elements 105, to obtain notifications upon occurrence of fault, alarm, event, etc., and to obtain any performance data. Each of the interfaces EXT41, EXT42 . . . EXT4*m* may employ any standard protocol (e.g., SNMP, netconf/yang, openflow, REST etc.) or any other proprietary protocol.

Figure 1B:
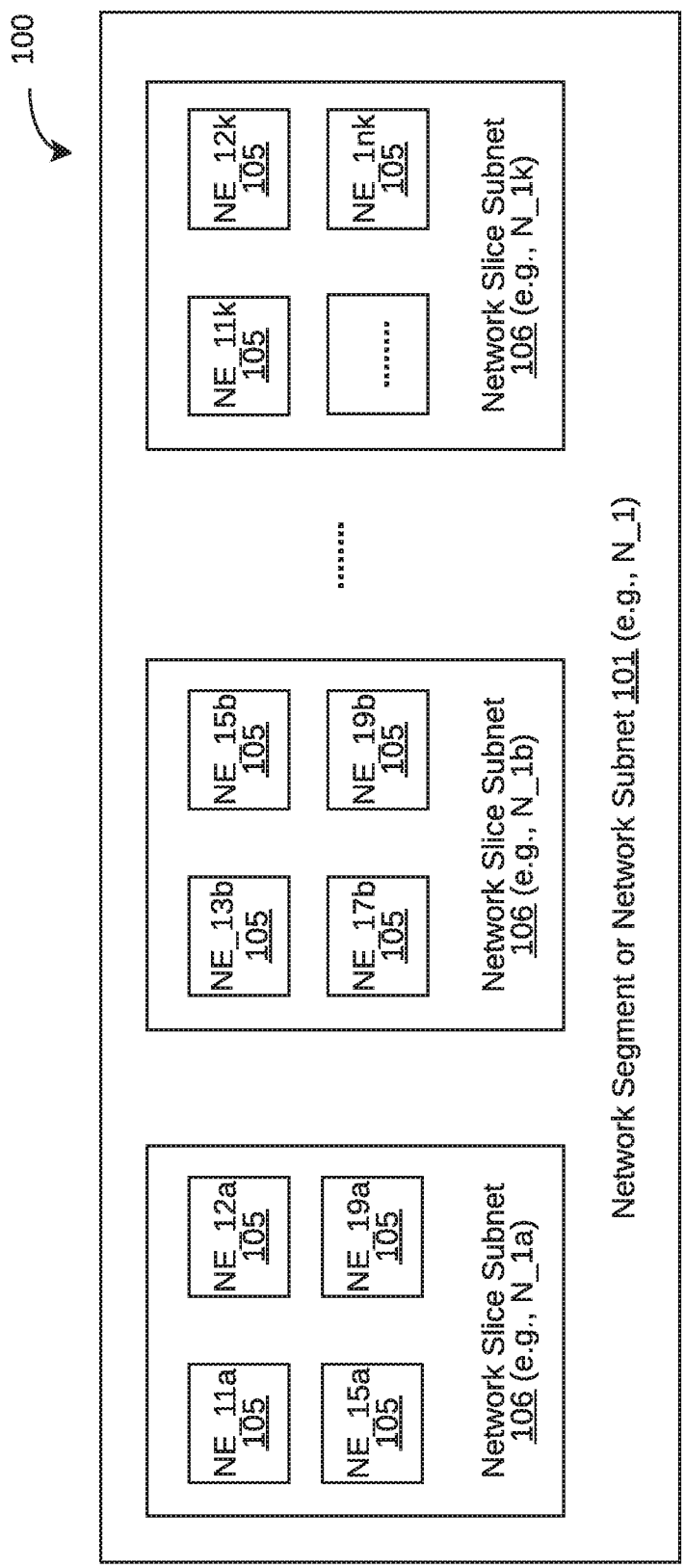
FIG. 1B illustrates constituents of an exemplary network segment in presence of network slicing.

Referring now to FIG. 1B, constituents of an exemplary network segment in presence of network slicing is illustrated. As will be appreciated, network slicing may enable operators to provide portions of their networks for specific customer uses cases (e.g., smart home, Internet of Things (IoT), connected car, smart energy grid, etc.). Each use case may receive a unique set of optimized resources and network topology (covering certain SLA-specified factors such as connectivity, speed, and capacity) that suit the needs of that application or a set of applications. In other words, the network slicing may enable allocation of a set of network resource (i.e., slice) for a class of user, enterprise, or set of services having similar characteristics.

As illustrated, each of the network segments 101 may include a number of network elements 105, which may be part of one or more network slices or network slice subnets 106. Thus, network elements 105 (say, NE_s1*a*, NE_s2*a* . . . ) may be part of a network slice subnet 106 (say, N_Sa) of a network segment 101 (say, N_s). For example, in the illustrated embodiment, network segment N_1 may include network elements NE_11*a*, NE_12*a*, NE_15*a*, NE_19*a* in network slice subnet N_1*a*, network elements NE_13*b*, NE_15*b*, NE_17*b*, NE_19*b* in network slice subnet N_1*b*, and network elements NE_11*k*, NE_12*k* . . . NE_1*nk* in network slice subnet N_1*k*. As will be appreciated, in the illustrated embodiment, NE_11*a* may refer to an instance of network element NE_11 that is part of the network slice subnet N_1*a*, while NE_11*k* may refer to another instance of the same network element NE_11 that is part of the network slice subnet N_1*k*. Similarly, NE_12*a*, NE_15*a*, and NE_19*a* may refer to instances of network elements NE_12, NE_15, and NE_19 respectively that is part of the network slice subnet N_1*a*, while NE_12*k*, NE_15*b*, and NE_19*b* may refer to other instances of the network elements NE_12, NE_15, and NE_19 respectively that is part of the network slice subnet N_1*k*, or the network slice subnet N_1*b*. It should be noted that, in the illustrated embodiment, an instance of a network element 105 is shown to be part of only one network slice subnet 106 for the sake of simplicity and clarity. However, in practice, an instance of a network element 105 may be part of more than one network slice subnet 106 as well. Further, it should be noted that, for the sake of simplicity and clarity, the interconnections among the network elements 105 in each of the network slice subnets 106 as well as interconnections among network slice subnets 106 (e.g., a RAN slice subnet connecting to a core slice subnet) are not shown.

Figure 1C:
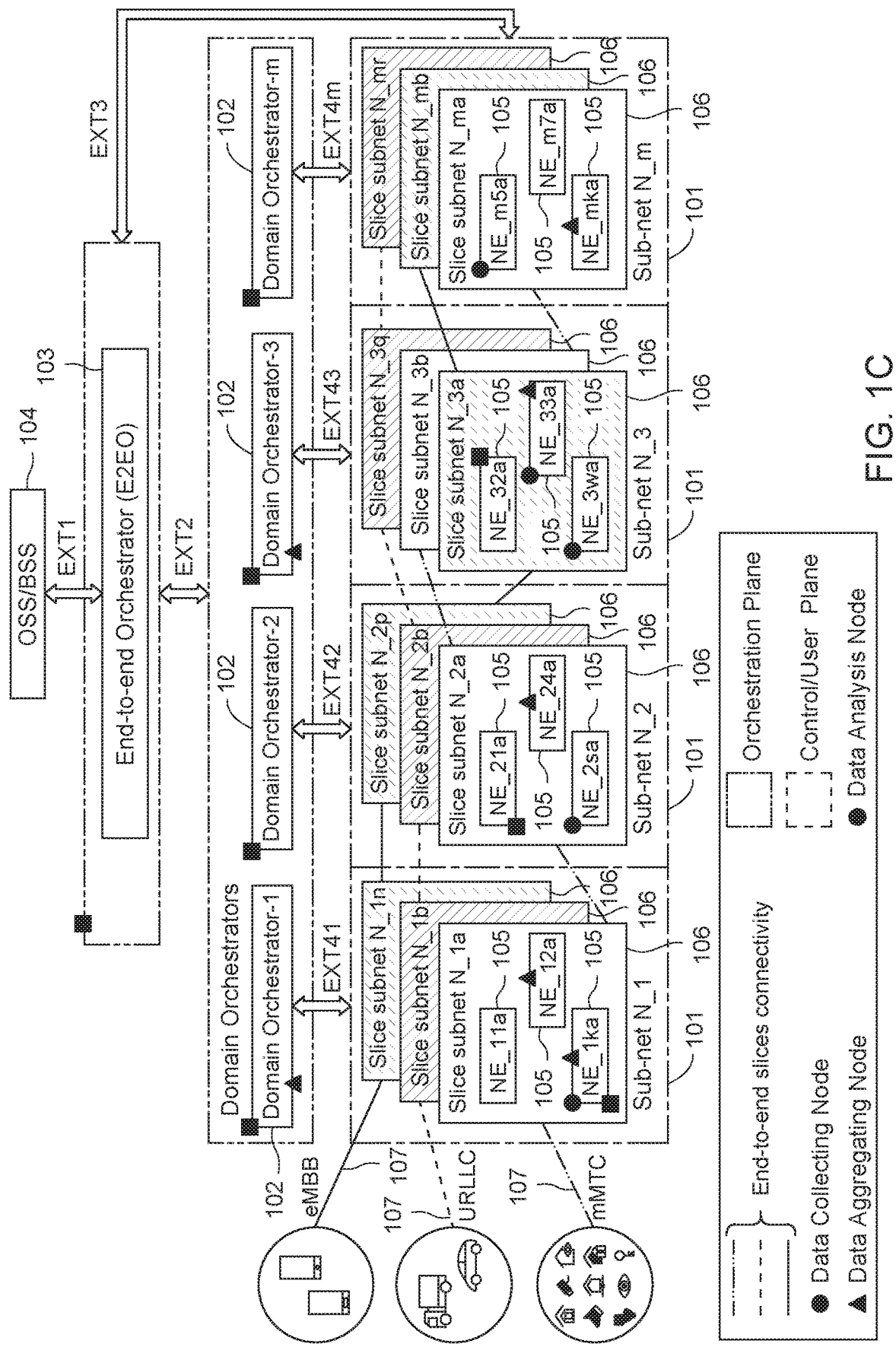
FIG. 1C illustrates an end-to-end view of the exemplary distributed heterogeneous communication network of FIG. 1A in the presence of network slicing.

Referring now to FIG. 1C, an end-to-end view of the exemplary distributed heterogeneous communication network 100 of FIG. 1A in the presence of network slicing is illustrated. In other words, FIG. 1C illustrates a superimposition of the concept of network slicing as described in reference to FIG. 1B in the communication network 100 of FIG. 1A. As stated above, each of the network segments 101 may be composed of one or more network slice subnets 106. For example, in the illustrated embodiment, network segment N_1 may be composed of 'n' network slice subnets N_1*a*, N_1*b* . . . N_1*n*, network segment N_2 may be composed of 'p' network slice subnets N_2*a*, N_2*b* . . . N_2*p*, network segment N_3 may be composed of 'q' network slice subnets N_3*a*, N_3*b* . . . N_3*q*, and network segment N_m may be composed of 'r' network slice subnets N_ma, N_mb . . . N_mr.

The communication network 100 may further include one or more end-to-end (E2E) network slices 107 (also referred to as E2E slice 107 or network slice 107). Each of the E2E network slices 107 may be composed of one or more network slice subnets 106 across network segments 101 that may be 'stitched' together (i.e., communicatively interconnected to each other). The interconnections among network slice subnets 106 may be based on one or more standard protocols (e.g., transmission control protocol/Internet protocol (TCP/IP), general packet radio service tunneling protocol (GTP), etc.) and/or other proprietary protocols. For example, in the illustrated embodiments, E2E network slice 1 (say, for massive machine type communications (mMTC)) may be composed of network slice subnets N_1a, N_2a, N_3b . . . N_ma; E2E network slice 2 (say, for ultra-reliable low latency communications (URLLC)) may be composed of network slice subnets N_1b, N_2b, N_3q . . . N_mr; and E2E network slice 3 (say, for enhanced mobile broadband (eMBB)) may be composed of network slice subnets N_1n, N_2p, N_3a . . . N_mb.

Typically, the E2EO device present in a 4G or a 5G communication network performs E2E orchestration of services and network slices. As stated above, the E2EO device 103 present in the communication network 100 may additionally orchestrate effective data collection, aggregation and analysis. In particular, the E2EO device 103 may be enhanced, in accordance with some embodiments of the present disclosure, so as to determine one or more nodes (e.g., network elements 105, domain orchestration device 102, E2EO 103, etc.) of the communication network 100 for data collection, data aggregation, and data analysis. As will be described in greater detail in conjunction with FIGS. 2-5, the E2EO device 103 may interface with the domain orchestration devices 102 as well as with the network elements 105 in the various network segments 101 or network slice subnets 106 so as to perform orchestration of data collection, aggregation and analysis. The E2EO device 103 may determine collection nodes (i.e., nodes for collecting data), aggregation nodes (i.e., nodes for aggregating data), and analysis nodes (i.e., nodes for analyzing data). Further, the E2EO device 103 may determine data to be collected by the determined collection nodes, data to be aggregated by the determined aggregation nodes, and data to be analyzed by the determined analysis nodes.

Figure 2:
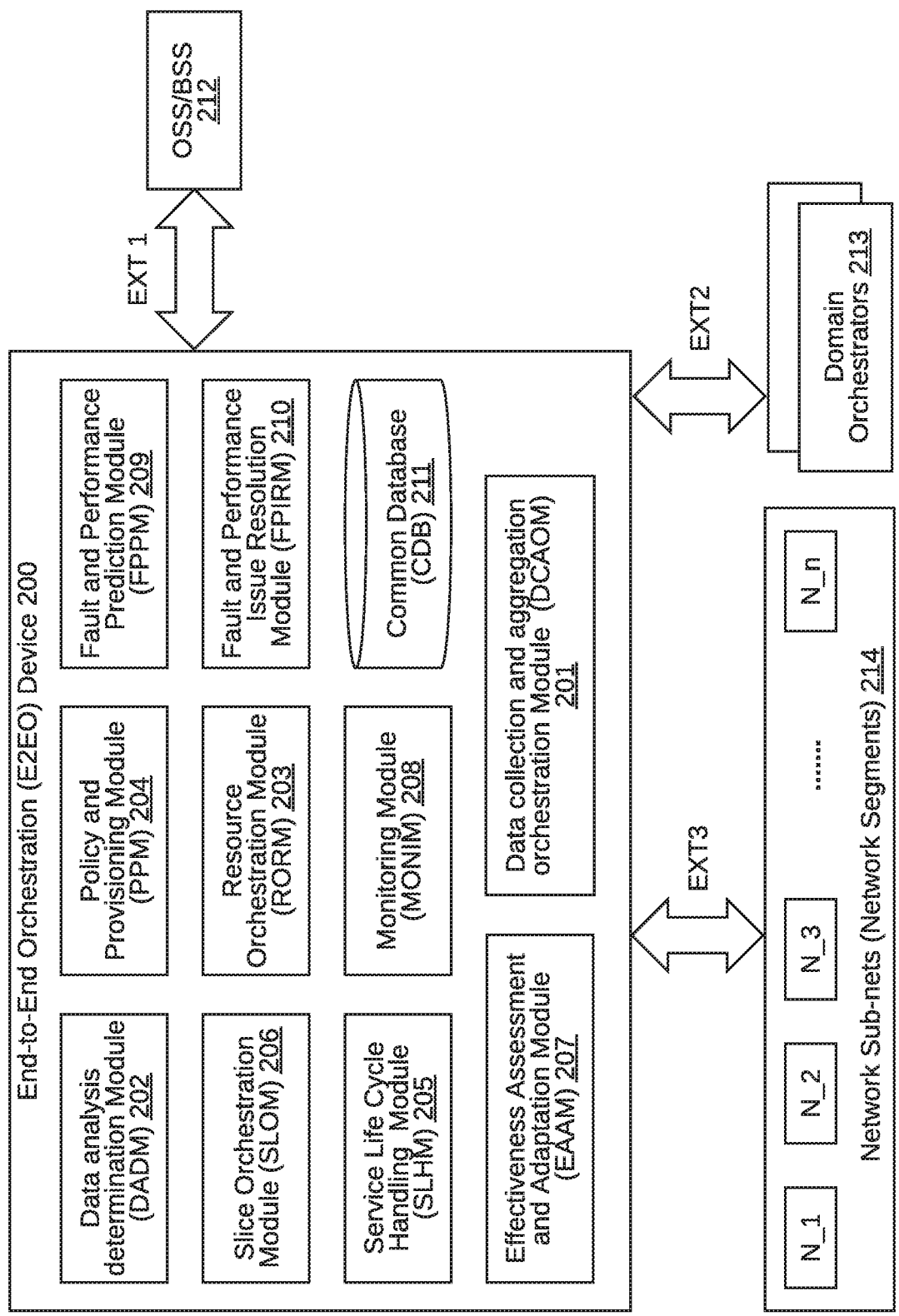
FIG. 2 is a functional block diagram of an exemplary E2E orchestration (E2EO) device that may be implemented by the distributed heterogeneous communication network of FIG. 1A or FIG. 1C for effective data collection, aggregation, and analysis, in accordance with some embodiments of the present disclosure.

Referring now to FIG. 2, a functional block diagram of an exemplary E2EO device 200, analogous to the E2EO device 103 implemented by the distributed heterogeneous communication network 100 of FIGS. 1A and 1C, is illustrated in accordance with some embodiments of the present disclosure. As will be described in greater detail below, in addition to its existing responsibilities, the E2EO device 200 may orchestrate effective data collection, aggregation and analysis for service level maintenance. In particular, the E2EO device 200 may determine impact characteristics with respect to a network slice or a service in the distributed heterogeneous communication network 100. It should be noted that the impact characteristics comprise at least one of: user characteristics, service characteristics, slice characteristics, network characteristics, or performance characteristics. Additionally, the E2EO device 200 may determine one or more collection nodes, one or more aggregation nodes, and one or more analysis nodes within the distributed heterogeneous communication network 100 based on the impact characteristics, and may activate the one or more collection nodes for collecting data, the one or more aggregation nodes for aggregating the collected data, and the one or more analysis nodes for analyzing the aggregated data.

In some embodiments, various modules in the E2EO device 200 may include a data collection and aggregation orchestration module (DCAOM) 201, a data analysis determination module (DADM) 202, a resource orchestration module (RORM) 203, a policy and provisioning module (PPM) 204, a service lifecycle handling module (SLHM) 205, a slice orchestration module (SLOM) 206, an effectiveness assessment and adaptation module (EAAM) 207, a monitoring module (MONIM) 208, a fault and performance prediction module (FPPM) 209, and a fault and performance issue resolution module (FPIRM) 210. Additionally, the E2EO device 200 may implement a common database (CDB) 211 accessible by various modules 201-210. The various modules 201-210 and the CDB 211 may interact with each other using REST API calls, sending message over known message bus frameworks such as kafka, or using other inter-process communication or proprietary mechanisms. Further, the E2EO device 200 may interface with OSS/BSS 212 (analogous to OSS/BSS 104), domain orchestration devices 213 (analogous to domain orchestration devices 102), and one or more network elements in one or more network segments 214 (analogous to network segments 101) using interfaces EXT1, EXT2, and EXT3 respectively.

In accordance with aspects of the present disclosure, the DCAOM 201 may determine a major part of the monitoring context for the service/slice. The monitoring context may include what data to collect, where to collect the data, granularity and frequency of data collection for different parameters (KPIs), where to aggregate the data, what data to analyze, where to analyze the data, priority, sequence and accuracy level of the analysis. Thus, the DCAOM 201 may determine what data to be collected for a service/slice and where to collect the data (i.e., appropriate node/NE that shall collect each data item required for the service/slice monitoring). Additionally, the DCAOM 201 may interact with the DOM-DCAOM (i.e., DCAOM in the domain orchestrator 213) for determining the exact location and instance of the node/NE that shall collect a particular data item for a service/slice. Further, the DCAOM 201 may determine which node/NE shall aggregate the data.

The DCAOM 201 may perform above actions while instantiating a service/slice as well as when there is a change in the monitoring context. In some embodiments, the monitoring context may be determined based on various impact characteristics or parameters. These impact characteristics or parameters may include, but may not be limited to, user characteristics (e.g., location of user, type of user device, power level of user device, identification of user, policy with respect to user, credit limit of user, mobility of user, etc.), service characteristics (e.g., type of service, policy with respect to service, bandwidth consumed by service, key performance indicators (KPI's) of service, activation of new services that may impact the service under consideration, dynamic changes in media types used such as addition of video to an earlier audio session, etc.), slice characteristics (policy with respect to slice, bandwidth consumed by slice, key performance indicators (KPI's) of slice, activation of new services/slices that may impact the slice under consideration, etc.), network characteristics (e.g., type of access network, location of service, extent of network slice, dynamic network conditions, etc.), or performance characteristics (e.g., environmental factors, target service level agreements (SLAs) for the network slice or the service, target KPIs for the network slice or the service, historical fault data, historical performance data, detected or predicted fault or performance issue in the network slice or the service, a resolution for the detected or the predicted fault or performance issue, or degradation in KPIs due to data collection or aggregation, a number of exceptions occurred, etc.). The dynamic network conditions may include network congestion, high resource occupancy levels, etc.

The DCAOM 201 may interact with the DOM-DCAOM (not shown) for determining the exact instance of a node chosen to perform data collection or data aggregation.

Additionally, the DCAOM may interact with DADM 202 to request determination of appropriate analysis for a service/slice. The DCAOM 201 may be requested to determine the monitoring context by the SLHM 205 or SLOM 206 for a service/slice during service/slice instantiation, and by the FPPM 209, FPIRM 210, or the MONIM 208 to determine any change(s) in monitoring context upon detection of any fault or performance issue, or change in service context (also referred to as service characteristics), user context (also referred to as user characteristics), or network conditions (also referred to as network characteristics).

The DCAOM 201 may use the following data-structures/information elements:

SERV-MON-PARAMS-TABLE: This table contains the information to be monitored for a service, for e.g., segment-wise latency, uplink throughput, maximum data burst size, etc. It also contains the priority of each information item to be monitored—the priority could be simply a fixed value or expressed as a set of rules/conditions.

MAND-MON-SERV-PARAMS: This is the list of mandatory parameters to be monitored for a service, for e.g., packet loss rate, which have to be monitored irrespective of any other factors such as network conditions, user category, etc.

COND-MON-SERV-PARAMS: This is the list of parameters that have to be monitored for a service only if certain conditions are met, e.g., security exceptions when the service is delivered over a shared-access medium such as Wi-Fi, queue size(s) in core network elements when the congestion level is >threshold, etc.

SLICE-MON-PARAMS-TABLE: This table contains the information to be monitored for a slice, for e.g., slice sub-net latency, uplink throughput, total throughput realized, etc. It also contains the priority of each information item to be monitored—the priority could be simply a fixed value or expressed as a set of rules/conditions.

MAND-MON-SLICE-PARAMS: This is the list of mandatory parameters to be monitored for a slice, for e.g., overall throughput, which have to be monitored irrespective of any other factors such as network conditions, active services, user category, etc.

COND-MON-SLICE-PARAMS: This is the list of parameters that have to be monitored for a slice only if certain conditions are met, e.g., security exceptions when the slice consists of one or more shared sub-nets or is delivered over a shared-access medium such as Wi-Fi, queue size(s) in each slice sub-net when the congestion level is >threshold in that sub-net, etc.

SERV-MON-PARAMS-LIST: This is the list of parameters/events to be monitored for a particular service under a given set of conditions, at a particular point of time. This comprises of MAND-MON-SERV-PARAMs for the service as well as relevant COND-MON-SERV-PARAMS based on conditions fulfilled at that instant.

SLICE-MON-PARAMS-LIST: This is the list of parameters/events to be monitored for a particular slice under a given set of conditions, at a particular point of time. This comprises of MAND-MON-SLICE-PARAMs for the slice as well as relevant COND-MON-SLICE-PARAMS based on conditions fulfilled at that instant.

MON-PARAMS-DCM-TABLE: This table contains the mapping of the data to be collected for each item to be monitored (as determined by the DCAOM 201 from SERV-MON-PARAMS-TABLE for a service or from SLICE-MON-PARAMS-TABLE for a slice).

DATA-COLL-LIST: This contains the list of items (DATA-COLL-ITEMs) for data collection for a particular service/slice.

DATA-COLL-ITEM: This the individual item whose value has to be collected periodically/upon occurrence, e.g., throughput in 4G RAN, re-transmissions in Wi-Fi access, throughput in 5G core network, processor failure alarm, etc. The set of DATA-COLL-ITEMs for a service/slice makes up the DATA-COLL-LIST.

DATA-COLL-SRC-TABLE: This table contains the mapping between each data item to be collected and the possible source(s) in the network.

DATA-COLL-POSS-NODE-LIST: This contains the list of possible nodes for data collection for a particular data item, and is formed using DATA-COLL-SRC-TABLE and other factors such as access type, policy constraints, etc.

NODE-CAPAB-TABLE: This contains the feasibility of a particular node to collect data for a particular data collection item.

DATA-COLL-THRES: This is the resource threshold in a particular node for it to be able to collect data effectively. It can be simply expressed as a percentage of available resources, provisioned in initially, and then adapted using self-learning. This will be described in greater detail in conjunction with FIG. 5.

REL-LEVEL: This is the reliability level of a particular node/NE in the network. Initial value is provisioned (default) and is then adapted. This will be described in greater detail in conjunction with FIG. 5.

MOB-MAPPING-TABLE: This contains the mapping between the mobility of the user of a service/slice and the mobility factor to be applied while determining the fitness of a node for data collection.

FITNESS-THRES: This specifies the threshold of a node to be able to collect data effectively.

DATA-TRANS-PCF-TABLE: This table provides the priority, criticality and frequency of transmission of the data items.

GRAN-TABLE: This table contains the granularity of information to be transmitted under normal and resource-constrained (i.e., when resource occupancy levels are greater than pre-provisioned threshold) conditions for each data item.

In accordance with aspects of the present disclosure, the DADM 202 may determine a part of the monitoring context as follows:

Determine what data to analyze based on DATA-ANALY-TABLE which contains the mapping of what data to be analyzed for a given set of (service/slice) KPIs, service priority, and user category.

Determine where to do the analysis, i.e., the node/network element (NE) that has to perform the analysis. This function may be extended from the mechanism of appropriate placement and sequencing of cognitive functions (may be also extended to determine the place(s) where analysis not involving cognitive functions (CFs) could be done). The mechanism of appropriate placement and sequencing of CFs is described in co-pending Indian Patent Application No. 201841046658 (U.S. patent application Ser. No. 16/358,751) by the Applicant, the contents of which are incorporated herein in their entirety by reference.

Determine accuracy, granularity and frequency to analyze using GRAN-FREQ-ANALY-TABLE.

Determine priority of analysis based on the service priority and user category.

Determine the minimum accuracy of analysis (MIN-ANALY-ACCU-LEVEL) using ANALY-ACCU-LEVEL-TABLE. This is used to determine the waiting time for data inputs and allowed number of missing/inconsistent data.

The RORM 203 may determine the resources to be allocated for the service/slice, and also the location where the resources have to be allocated. The RORM 203 may also be responsible for carrying out scale in/scale out actions based on the resource occupancy levels in the network for a particular service/slice. The RORM 203 may interact closely with the SLHM 205 or SLOM 206 for performing orchestration actions on a service/slice. In addition to its existing functions, the RORM 203 may interact with the DCAOM 201 and the DADM 202 to appropriately scale instances of the node(s) chosen to perform data collection, aggregation or analysis.

The PPM 204 may be responsible for obtaining the policy and other provisioned inputs including various rules, thresholds and parameter values. Such inputs may include service details such as target KPIs (TARGET-SERV-KPIs), service priority, slice details such as target KPIs (TARGET-SLICE-KPIs), slice priority, etc. In addition to its existing functions, the PPM 204 may also obtain all necessary parameter values and thresholds required for effective data collection, aggregation and analysis. Such parameter values and thresholds may include capabilities of various nodes in the network to perform data collection, aggregation and analysis, topology of the network, initial values of various thresholds such as FITNESS-THRES, etc.

The SLHM 205 may perform the lifecycle maintenance and management of services. Lifecycle actions may include, but may not be limited to, instantiation, scaling up/down, healing, modification, and deactivation of services based on factors such as service traffic and network conditions, user conditions, service characteristics, number of active users, exceptions, etc. Additionally, the SLHM 205 may interact with RORM 203 for orchestration of resources (including appropriate allocation, deallocation, movement/modification of resources, etc.) associated with the service. Further, the SLHM 205 may interact with the SLOM 206 for obtaining details of the slice in which the service has to be instantiated, or if any modifications/actions to a slice is required to be done. In addition to its existing functions, SLHM 205 may send a request the DCAOM 201 to determine the appropriate monitoring, data collection, aggregation and analysis (i.e., monitoring context) for the service, and subsequently activate the determined monitoring, data collection, aggregation and analysis for the service.

The SLOM 206 may perform the lifecycle maintenance and management of network slices. Lifecycle actions include instantiation, scaling up/down, healing and modification of slices based on factors such as service traffic and network conditions, service characteristics, request for new slice instantiation, number of active users, exceptions, etc. Additionally, the SLOM 206 may interact with RORM 203 for orchestration of resources (including appropriate allocation, deallocation, movement/modification of resources, etc.) associated with the slice. Further, the SLOM 206 may interact with the SLHM 205 for providing appropriate slice details for service(s) to be delivered, or if any modifications/actions to a slice is required to be done. In addition to its existing functions, the SLOM 206 may send a request the DCAOM 201 to determine the appropriate monitoring, data collection, aggregation and analysis for the slice (i.e., monitoring context), and subsequently activate the determined monitoring, data collection, aggregation and analysis for the slice.

The EAAM 207 may be responsible for assessing the effectiveness of KPI adherence for services and slices and overheads incurred, and then making necessary adjustments and improvements to rules, thresholds and parameter values. The effectiveness assessment may include evaluating the effectiveness of:

(a) Data collection (e.g., missed intervals, delay in meeting deadlines, resource usage, etc.), (b) Data aggregation (e.g., resolving conflicts, delays, resource usage, etc.), (c) Data Analysis (e.g., accuracy level, timeliness, resource usage, etc.), and (d) Fault and performance issue resolution and impact due to effectiveness of the data collection, data aggregation, and data analysis.

Thresholds adjusted by the EAAM 207 may include, but may not be limited to, FITNESS-THRES, RESOURCE-OCCUP-THRES, or the like. Similarly, rules/conditions adjusted by the EAAM 207 may include, but may not be limited to, COND-MON-SERV-PARAMS, COND-MON-SLICE-PARAMS, conditions for moving the data aggregation function from one node to another, or the like. Further, parameter values adjusted by the EAAM 207 may include, but may not be limited to, REL-LEVEL of a node for data collection, PROB-TIMELY-DELIV, etc.

The MONIM 208 may be responsible for monitoring the actual KPIs of a service/slice, and the associated parameters. The MONIM 208 may also monitor change in network conditions, service and slice characteristics, exceptions encountered in services/slices, etc. In addition to its existing functions, the MONIM 208 may also monitor the effectiveness of data collection, aggregation and analysis by keeping track of number of times collected data was not received by the node performing the aggregation (or received it after a delay), number of times the data could not be collected/aggregated/analyzed along with the reason, number of times the analysis did not result in a meaningful outcome before the occurrence of a fault/performance issue, etc. The MONIM 208 may obtain inputs from various network elements, as well as the various DOM-MONIM modules (MONIM in domain orchestrator 213). The MONIM 208 may share the relevant details of the collected data and observations with the FPPM 209, the FPIRM 210, the DCAOM 201, and the EAAM 207 (when needed).

The FPPM 209 may perform the prediction of fault and performance issues in active service(s) and slice(s). The FPPM 209 may use the data collected by the MONIM 208 for the analysis and may use well-known analytics or machine learning techniques (such as linear regression, support vector machine, etc.) or proprietary techniques also for predicting fault and performance issues. Upon prediction of an issue, the FPPM 209 may report it to the SLHM 205 in case of issues in one or more services, and to the SLOM 206 in case of issues in one or more slices. In addition to its existing functions, the FPPM 209 may also determine potential fault and performance issues due to resource constraints introduced by data collection, aggregation or analysis in a node that is part of control or user plane for one or more services/slices.

The FPIRM 210 may determine the resolution of an issue predicted by the FPPM 209 or detected during the monitoring by the MONIM 208. The FPIRM 210 may be requested by the SLHM 205 or SLOM 206 to resolve issues in service/slices. The FPIRM 210 may use techniques such as decision trees, deep learning, etc. or proprietary techniques to come up with possible resolution actions to address the fault/performance issue. In addition to its existing functions, the FPIRM 210 may trigger the DCAOM 201 to determine any updates in the monitoring context upon detection of a fault or performance issue in one or more services/slices.

The CDB 211 may be a persistent and scalable database to store all the state information associated with the various components, configuration items, as well as to store fault and performance metrics, etc. Additionally, the CDB 211 may store historical data of effectiveness of data collection, aggregation and analysis, resolution actions taken and their impact, etc.

The E2EO device 200 may include one or more processors (not shown) for executing one or more instructions for operating various modules or hosting such modules that perform orchestration of services, network slices, cognitive functions (CFs), data collection, data aggregation, data analysis, and other functions. For example, in some embodiments, all of the aforementioned modules may be co-located on the same processor. However, typically, only some of the modules may be co-located on the same processor while remaining may be located on other processors. Further, some of the processors may have special characteristic features to effectively host the module. The E2EO device 200 may further include one or more memory (not shown) for storing various instructions corresponding to various modules. The memory may also store multiple system and network parameters received by the E2EO device 200 as well as other data as required by or as processed by various modules. It should be noted that the memory may include a volatile memory and a non-volatile memory. For example, various instructions corresponding to various modules (that may be loaded in the one or more processors for execution) may be stored in the non-volatile memory, while various parameters and data may be stored in the volatile memory and/or the non-volatile memory. As stated above, the E2EO device 200 may also include a number of interfaces for interfacing with rest of the communication network so as to send and receive various data and commands.

For example, the E2EO 200 may obtain necessary inputs (provisioning) for effective data collection, aggregation and analysis from BSS/OSS 212 via the interface EXT1. The E2EO 200 may interact with domain orchestrators 213 via the interface EXT2. In particular, the DCAOM 201 may interact with DOM-DCAOM and MONIM 208 may interact with DOM-MONIM via the interface EXT2. In some embodiments, the interface EXT2 may employ standard protocols. As will be appreciated, employment of standard protocols may enable inter-operability without dependency on the equipment vendor. The E2EO 200 may interact with NE's or network functions in various network segments 214 via the interface EXT 3. It should be noted that, in some communication networks, the information exchange with the network functions in the various network segments 214 and the E2EO 200 may take place via domain orchestrators 213. In such embodiments, the interface EXT3 need not be present. The E2EO 200 may perform appropriate activation/deactivation of data collection, aggregation or analysis in a network function for a service/slice via the interface EXT3.

Figure 3:
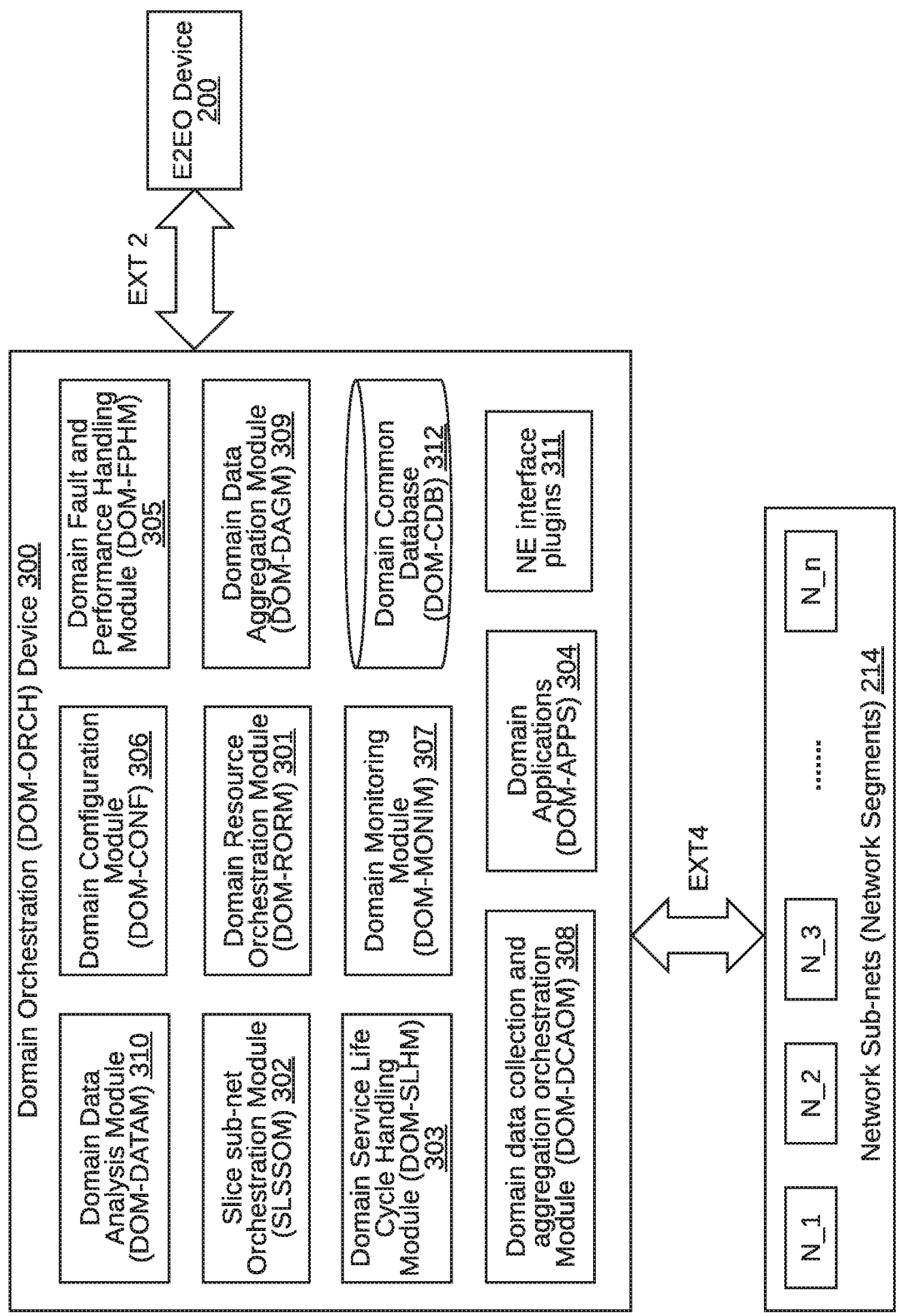
FIG. 3 is a functional block diagram of an exemplary domain orchestration (DOM-ORCH) device that may be implemented by the distributed heterogeneous communication network of FIG. 1A or FIG. 1C for effective data collection, aggregation, and analysis, in accordance with some embodiments of the present disclosure.

Referring now to FIG. 3, a functional block diagram of an exemplary DOM-ORCH device 300, analogous to the DOM-ORCH device 102 implemented by the distributed heterogeneous communication network 100 of FIGS. 1A and 1C, is illustrated in accordance with some embodiments of the present disclosure. As will be described in greater detail below, in addition to its existing responsibilities, the DOM-ORCH device 300 may interface with the E2EO device 200 as well as with the network elements in the various network segments 214 so as to perform orchestration of data collection, aggregation and analysis. In particular, upon receiving trigger from the E2EO device 200, the DOM-ORCH device 300 may activate one or more active instances of the collection node. It should be noted that, in the illustrated embodiment, all domain-specific orchestration functions, e.g., path computation engine in case of an SDN orchestrator, a Self-Optimizing Network (SON) component in a RAN orchestrator are abstracted and depicted as domain applications (DOM-APPS).

In some embodiments, various modules in the DOM-ORCH device 300 may include a domain resource orchestration module (DOM-RORM) 301, a slice subnet orchestration module (SLSSOM) 302, a domain service lifecycle handling module (DOM-SLHM) 303, domain applications (DOM-APPS) 304, a domain fault and performance handling module (DOM-FPHM) 305, a domain configuration module (DOM-CONF) 306, a domain monitoring module (DOM-MONIM) 307, a domain data collection and aggregation orchestration module (DOM-DCAOM) 308, a domain data aggregation module (DOM-DAGM) 309, a domain data analysis module (DOM-DATAM) 310. Additionally, the DOM-ORCH device 300 may implement a NE interface plugins 311 and a domain common database (DOM-CDB) 312 accessible by various modules 301-310. The various modules 301-310, NE interface plugins 311, and the DOM-CDB 312 may interact with each other using REST API calls, sending message over known message bus frameworks such as kafka, or using other inter-process communication or proprietary mechanisms. Further, the DOM-ORCH device 300 may interface with the E2EO device 200 and one or more network elements in one or more network segments 214 using interfaces EXT1 and EXT4 respectively.

The DOM-RORM 301 may determine the resources to be allocated for the service/slice within the domain, and also the location where the resources have to be allocated. The DOM-RORM 301 may be also responsible for carrying out scale in/scale out actions based on the resource occupancy levels in the network segment for a particular service/slice. The DOM-RORM 301 may interact closely with the SLSSOM 302 or DOM-SLHM 303 for performing orchestration actions on a service/slice. In addition to its existing functions, the DOM-RORM 301 may interact with the DOM-DCAOM 308 to scale instances of the node(s) chosen to perform data collection, aggregation, or analysis.

The SLSSOM 302 may perform the lifecycle maintenance and management of network slice sub-nets within the network domain that the DOM-ORCH 300 may be responsible for (e.g., RAN, core, transport, etc.). Lifecycle actions may include instantiation, scaling up/down, healing and modification of slice sub-nets based on factors such as service traffic and network conditions, service characteristics, request for new slice sub-net instantiation, number of active users, exceptions, etc. The SLSSOM 302 may interact with DOM-RORM 301 for orchestration of resources (including appropriate allocation, deallocation, movement/modification of resources, etc.) associated with the slice sub-net. In addition to its existing functions, the SLSSOM 302 may interact with the DOM-DCAOM 308 for information on new slice sub-net instantiated or any changes made to the slice sub-net so that the DOM-DCAOM 308 may perform appropriate selection or adjustments to the instances of the nodes performing data collection, aggregation or analysis for the slice sub-net.

The DOM-SLHM 303 may perform the lifecycle maintenance and management of services within the domain that the DOM-ORCH 300 may be responsible for. Lifecycle actions within the domain may include instantiation, scaling up/down, healing and modification of services based on factors such as service traffic and network conditions, user conditions, service characteristics, number of active users, exceptions, etc. The DOM-SLHM 303 may interact with DOM-RORM 301 for orchestration of resources (including appropriate allocation, deallocation, movement/modification of resources, etc.) associated with the service within the sub-net. It should be noted that the service within a domain may assume different meanings. For example, it may mean transport paths and wavelength assignments in an optical transport domain, service function chains in a core domain, bandwidth and radio resources in a RAN domain, etc. In addition to its existing functions, the DOM-SLHM 303 may interact with the DOM-DCAOM 308 for information on new service instantiated within the domain or any changes made to the service so that the DOM-DCAOM 308 may perform appropriate selection or adjustments to the instances of the nodes performing data collection, aggregation or analysis for the service.

As stated above, the DOM-APPS 304 may be a collection of one or more components for specific purpose, for e.g., path computation engine in an IP/optical domain, offload manager in a 4G core domain, etc. The DOM-FPHM 305 may be responsible for detecting and addressing fault and performance issues within the network sub-net. In addition to its existing functions, the DOM-FPHM 305 may do the following:

(a) send details of the fault/performance issue, actions taken and whether the issue was successfully resolved to the DOM-MONIM 307, which, in turn, may report the information to the MONIM 208 of the E2EO 200.

(b) request the DOM-DCAOM 308 to check if any changes are required with respect to the instances of the nodes performing data collection, aggregation or analysis for a service/slice.

The DOM-CONF 306 may be responsible for performing all the necessary configurations in the DOM-ORCH modules 301-310, as well as in the network elements within the network domain (i.e., network segments 214) controlled by the DOM-ORCH 300. In addition to its existing functions, the DOM-CONF 306 may be responsible for configuring the nodes (within the network domain controlled by the DOM-ORCH 300) chosen to perform data analysis for a service/slice sub-net (including the DOM-DATAM 310) based on the inputs received from the DADM 202 in the E2EO 200. The DOM-CONF 306 may also interact with DOM-RORM 301 for appropriate scaling of instances of the nodes chosen to perform data analysis for a service/slice sub-net.

The DOM-MONIM 307 may be responsible for monitoring the parameters and events as instructed by the MONIM 208 in the E2EO 200, and the associated parameters. The DOM-MONIM 307 may also monitor change in network conditions, service and slice sub-net characteristics, exceptions encountered in services/slice sub-nets, etc. In addition to its existing functions, the DOM-MONIM 307 may also monitor the effectiveness of data collection, aggregation and analysis within the domain/network sub-net by keeping track of number of times collected data was not received by the node performing the aggregation (or received it after a delay), number of times the data could not be collected/aggregated/analyzed along with the reason, number of times the analysis did not result in a meaningful outcome before the occurrence of a fault/performance issue, etc. The DOM-MONIM 307 may obtain inputs from various network elements in the network domain controlled by the DOM-ORCH 300, as well as other modules in the DOM-ORCH 300. The DOM-MONIM 307 may share the relevant details of the collected data and observations with the MONIM 208 in the E2EO 200.

In accordance with aspects of the present disclosure, the DOM-DCAOM 308 may determine the instance of the node where the data collection has to be performed for a particular parameter, and also initiates the necessary scaling actions (if needed) by requesting the DOM-SLHM 303 or SLSSOM 302 and the DOM-RORM 301. The DOM-DCAOM 308 may determine the priority, criticality and frequency of transmission of each parameter from DATA-TRANS-PCF-TABLE. The DOM-DCAOM 308 may assign, based on the priority, appropriate guaranteed bandwidth in DATA-COLL-NODE to transfer the collected data in a timely manner. Additionally, the DOM-DCAOM 308 may assign, based on the criticality, appropriate mechanism of error control, retransmission and buffering. Moreover, the DOM-DCAOM 308 may assign, based on the frequency of transmission, appropriate storage and allocates bandwidth periodically.

The DOM-DCAOM 308 may perform all the above actions while instantiating a service/slice as well as when there is a change in monitoring context (i.e., when there is a change in impact parameters). By way of an example, the change in the monitoring context may include, but may not be limited to, new location, high number of exceptions occurred, many new services have been activated which could impact the service/slice under consideration, change of access network), user conditions (e.g., low battery, reaching limit of credit), network conditions (e.g., congestion, high resource occupancy levels), service characteristics (e.g., video added to an earlier audio session), or the like.

The DOM-DAGM 309 may perform aggregation of the data items for a service/slice sub-net. In addition to its existing functions, DOM-DAGM 309 may obtain the frequency and priority of data aggregation for a service/slice sub-net from the DOM-DCAOM 308 and may perform data aggregation accordingly. The DOM-DATAM 310 may perform analysis of the data for one or more services/slices. In addition to its existing functions, the DOM-DATAM 310 may obtain the accuracy, sequence and priority of analysis for a particular service/slice from the DOM-CONF 306, and may perform the analysis accordingly.

The DOM-ORCH device 300 may include one or more processors (not shown) for executing one or more instructions for operating various modules or hosting such modules that perform orchestration of network segment, network slices, and other functions. For example, in some embodiments, all of the aforementioned modules may be co-located on the same processor. However, typically, only some of the modules may be co-located on the same processor while remaining may be located on other processors. Further, some of the processors may have special characteristic features to effectively host the module. The DOM-ORCH device 300 may further include one or more memory (not shown) for storing various instructions corresponding to various modules. The memory may also store multiple system and network parameters received by the DOM-ORCH device 300 as well as other data as required by or as processed by various modules. It should be noted that the memory may include a volatile memory and a non-volatile memory. For example, various instructions corresponding to various modules (that may be loaded in the one or more processors for execution) may be stored in the non-volatile memory, while various parameters and data may be stored in the volatile memory and/or the non-volatile memory. As stated above, the DOM-ORCH device 300 may also include a number of interfaces for interfacing with rest of the communication network so as to send and receive various data and commands.

For example, the DOM-ORCH device 300 may interact with E2EO device 200 via the interface EXT2. In particular, the DOM-DCAOM 308 may interact with DCAOM 201 and DOM-MONIM 307 may interact with MONIM 208 via the interface EXT2. Further, DOM-ORCH device 300 may interact with network functions in the network segments 214 controlled by the DOM-ORCH device 300 via the interface EXT4. The DOM-ORCH device 300 may perform appropriate activation/deactivation of data collection, aggregation or analysis in a network function for a service/slice via the interface EXT4.

It should be noted that the E2EO device 200 or the DOM-ORCH device 300 may be implemented in programmable hardware devices such as programmable gate arrays, programmable array logic, programmable logic devices, and so forth. Alternatively, as stated above, the E2EO device 200 or the DOM-ORCH device 300 may be implemented in software for execution by various types of processors. An identified module of executable code may, for instance, include one or more physical or logical blocks of computer instructions which may, for instance, be organized as an object, procedure, function, or other construct. Nevertheless, the executables of an identified module need not be physically located together, but may include disparate instructions stored in different locations which, when joined logically together, include the module and achieve the stated purpose of the module. Indeed, a module of executable code may be a single instruction, or many instructions, and may even be distributed over several different code segments, among different applications, and across several memory devices.

In other words, the E2EO device 200 may be realized as multiple components (e.g., slice orchestrator(s), service orchestrator(s), and cognitive function (CF) orchestrator, etc.) in different deployment scenarios or configurations. However, the functional blocks and the processes described herein may be applicable even under such conditions.

As will be appreciated by one skilled in the art, a variety of processes may be employed for performing orchestration of effective data collection, aggregation, and analysis in the communication network 100. For example, the E2EO device 200 may facilitate orchestration of data collection, aggregation, and analysis for SLA maintenance by the processes discussed herein. In particular, as will be appreciated by those of ordinary skill in the art, control logic and/or automated routines for performing the techniques and steps described herein may be implemented by components of the communication network 100 (e.g., the E2EO device 200 and the DOM-ORCH device 300), either by hardware, software, or combinations of hardware and software. For example, suitable code may be accessed and executed by the one or more processors on the E2EO device 200 to perform some or all of the techniques described herein. Similarly, application specific integrated circuits (ASICs) configured to perform some or all of the processes described herein may be included in the one or more processors on the E2EO device 200.

Figure 4:
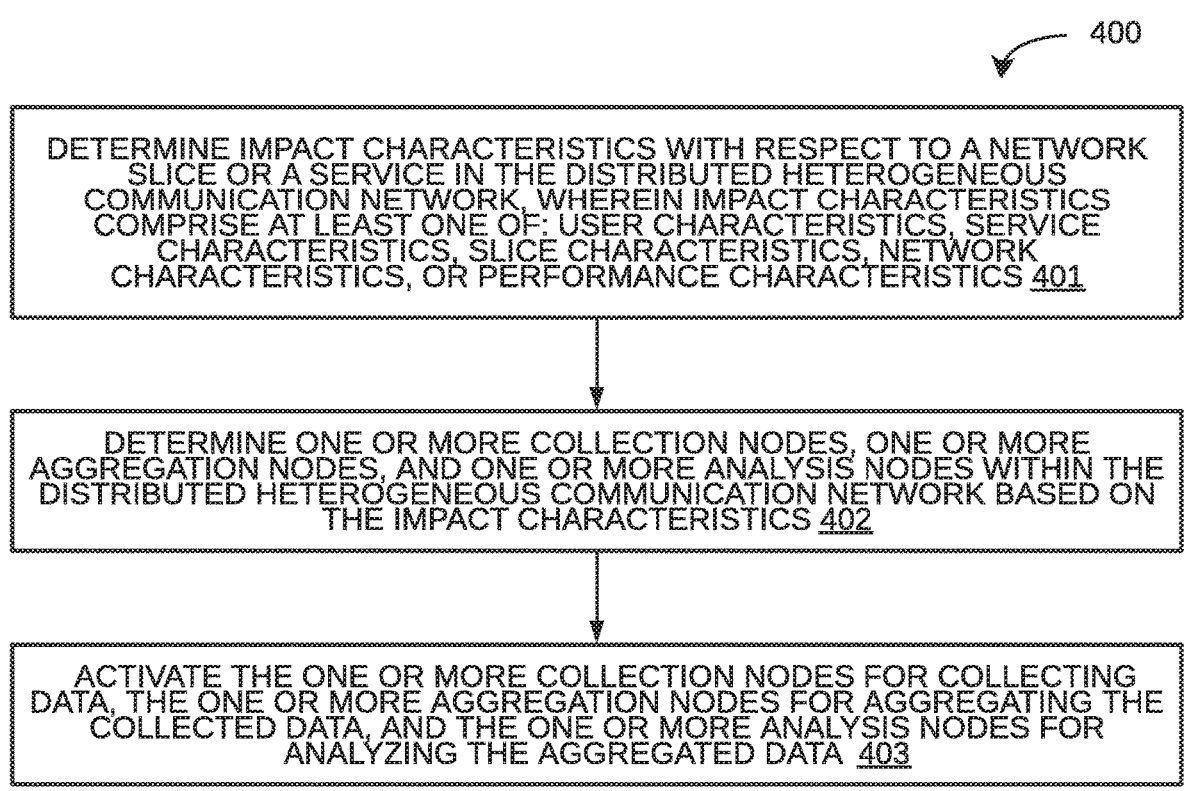
FIG. 4 is a flow diagram of an exemplary process for effective data collection, aggregation, and analysis in the distributed heterogeneous communication network, in accordance with some embodiments of the present disclosure.

For example, referring now to FIG. 4, exemplary control logic 400 for effective data collection, aggregation, and analysis in a communication network 100 via a network device, such as the E2EO device 200, is depicted via a flowchart in accordance with some embodiments of the present disclosure. As illustrated in the flowchart, the control logic 400 may include the step of determining impact characteristics with respect to a network slice or a service in the distributed heterogeneous communication network at step 401, determining one or more collection nodes, one or more aggregation nodes, and one or more analysis nodes within the distributed heterogeneous communication network based on the impact characteristics at step 402, and activating the one or more collection nodes for collecting data, the one or more aggregation nodes for aggregating the collected data, and the one or more analysis nodes for analyzing the aggregated data at step 403.

It should be noted that the impact characteristics may include at least one of: user characteristics, service characteristics, slice characteristics, network characteristics, or performance characteristics. In some embodiments, the network characteristics may include at least one of a type of access network, a location of the service, an extent of the network slice, or dynamic network conditions. In such embodiments, the dynamic network conditions may include at least one of a congestion in a network segment, or a resource occupancy level in the network segment. Additionally, in some embodiments, the user characteristics may include at least one of a location of user, a mobility of the user, a credit limit of the user, a type of user access device, a power level of the user access device, an identification of a user, or a policy with respect to the user. Further, in some embodiments, the slice or the service characteristics may include at least one of a type of service, a policy with respect to the network slice or the service, a bandwidth consumed by the network slice or the service, or actual key performance indicators (KPIs) for the network slice or the service. Moreover, in some embodiments, performance characteristics may include at least one of environmental factors, target service level agreements (SLAs) for the network slice or the service, target KPIs for the network slice or the service, historical fault data, historical performance data, detected or predicted fault or performance issue in the network slice or the service, a resolution for the detected or the predicted fault or performance issue, or degradation in KPIs due to data collection or aggregation.

In some embodiments, the control logic 400 may further include the step of determining the data to be collected by the one or more collection nodes. In such embodiments, determining the data to be collected may include the steps of determining a set of parameters to be monitored for the network slice or the service, and determining the data to be collected for the set of parameters to be monitored based on pre-defined mapping rules or adapted mapping rules for data collection. Additionally, in such embodiments, the set of parameters may include at least one of a set of metrics, a set of events, or a set of other parameters. Further, in such embodiments, the set of parameters may include at least one of a set of mandatory parameters to be necessarily monitored or a set of conditional parameters to be monitored upon fulfillment of one or more pre-defined conditions.

In some embodiments, determining the one or more collection nodes at step 402 may include the steps of determining a set of possible collection nodes, from among a plurality of nodes, for the data to be collected based on a pre-defined list of data collection sources and a plurality of data collection factors, and determining the one or more collection nodes from among the set of possible collection nodes based on at least one of a capability or a level of fitness of each of the set of possible collection nodes. In such embodiments, the plurality of data collection factors may include at least one of an access type used for the service or the network slice, a set of policy constraints, a frequency for required data collection, or a granularity for the required data collection. Additionally, in such embodiments, the level of fitness may be based on at least one of a reliability, a support for handover of data collection, a support for user mobility, or a level of security.

In some embodiments, activating each of the one or more collection nodes at step 403 may include the step of determining one or more active instances for each of the one or more collection nodes by determining a domain orchestration (DOM-ORCH) device corresponding to a collection node, and triggering the DOM-ORCH device to activate the one or more active instances of the collection node based on at least one of a location of the collection node, a resource occupancy level of the collection node, a feasibility of the collection node to scale-up, or involvement of the one or more instances in the service or the network slice.

In some embodiments, the control logic 400 may further include the step of determining the data to be aggregated by the one or more aggregation nodes. In such embodiments, determining the data to be aggregated may include the step of determining the data to be aggregated for a set of parameters to be monitored, for the network slice or the service, based on pre-defined mapping rules or adapted mapping rules for data aggregation. Additionally, in some embodiments, determining the one or more aggregation nodes at step 402 may include the steps of determining a set of possible aggregation nodes, from among a plurality of nodes, for the data to be aggregated based on a pre-defined list of data aggregation sources, and determining the one or more aggregation nodes from among the set of possible aggregation nodes based on at least one of: an availability of resources at each of the set of possible aggregation nodes, a distance between each of the set of possible aggregation nodes and each of the one or more collection nodes, or a network condition in an intervening path between each of the set of possible aggregation nodes and each of the one or more collection nodes.

In some embodiments, the collected data may be transmitted from the one or more collection nodes to the one or more aggregation nodes in a pre-determined sequence, at a required frequency, and at a required granularity.

In some embodiments, the control logic 400 may further include the step of determining the data to be analyzed by the one or more analysis nodes. In such embodiments, determining the data to be analyzed may include the steps of determining one or more analyses to be performed, and determining the data to be analyzed for the one or more analyses based on pre-defined mapping rules or adapted rules for data analysis. Additionally, in some embodiments, determining the one or more analysis nodes at step 402 may include the step of determining the one or more analysis nodes and a sequence of performing the one or more analyses by performing effective orchestration of cognitive functions (CFs). In such embodiments, the control logic 400 may further include the step of determining at least one of a minimum accuracy level, a granularity, or a frequency of each of the one or more analyses.

In some embodiments, the control logic 400 may further include the step of determining a need for change in data collection, aggregation and analysis for the network slice or the service, upon detecting a change in the impact characteristics. In such embodiments, the control logic 400 may further include the step of determining and performing a re-configuration of at least one of the one or more collection nodes, the one or more aggregation nodes, or the one or more analysis nodes for the network slice or the service, upon determining the need for change.

In some embodiments, the control logic 400 may further include the step of assessing an effectiveness of the data collection, aggregation and analysis for the network slice or the service. In such embodiments, the control logic 400 may further include the step of performing tuning of at least one of: pre-defined parameters to be monitored, mapping rules, and thresholds for determining nodes for data collection, aggregation, and analysis; a frequency of data collection, aggregation, and analysis; a granularity of data collection, aggregation, and analysis; or an accuracy of data analysis.

Figure 5:
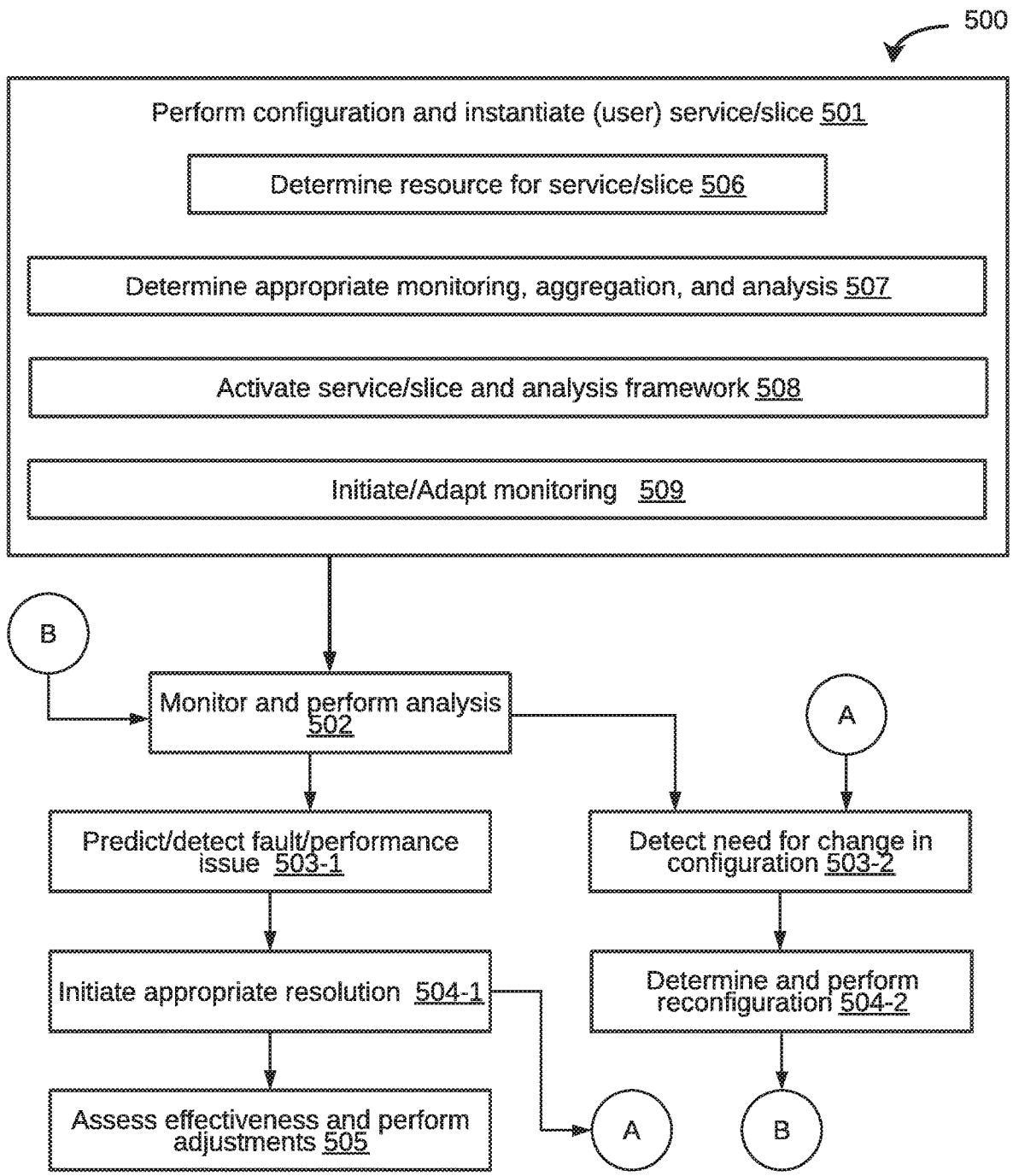
FIG. 5 is a flow diagram of a detailed exemplary process for effective data collection, aggregation, and analysis in the distributed heterogeneous communication network, in accordance with some embodiments of the present disclosure.

Referring now to FIG. 5, exemplary control logic 500 for effective data collection, aggregation, and analysis in a communication network 100 is depicted in greater detail, via a flowchart, in accordance with some embodiments of the present disclosure. As illustrated in the flowchart, the control logic 500 may include the steps of performing configuration and instantiating a service or a network slice at step 501, monitoring and performing analysis at step 502, predicting or detecting a fault and/or performance issue at step 503-1, detecting a need for change in configuration at step 503-2, initiating an appropriate resolution at step 504-1, determining and performing reconfiguration at step 504-2, and assessing effectiveness and performing adjustments at step 505. Each of these steps will be described in greater detail herein below.

In some embodiments, at step 501, the control logic 500 may perform configuration and instantiate the service or the network slice by determining resources for the service or the network slice at step 506, determining appropriate monitoring, aggregation, and analysis at step 507, activating the service or the network slice and analysis framework at step 508, and initiating or adapting the monitoring at step 509.

At step 506, the PPM 204 may receive a request for service instantiation. The PPM 204 may then send a message to the SLHM 205 to instantiate the service, and may pass following information that it received as input in the service instantiation request: Service identifier (SERV-ID), Target Service KPIs (TARGET-SERV-KPI), Service location details (SERV-TA, SERV-RA), Service Priority (SERV-PRIO), and User category (USER-CAT) (if applicable). Similarly, the PPM 204 may receive a request for the network slice instantiation. The PPM 204 may then send a message to the SLOM 206 to instantiate the network slice, and may pass following information that it received as input in the slice instantiation request: Slice identifier (SLICE-ID), Target Slice KPIs (TARGET-SLICE-KPI), Slice location details (SLICE-TA, SLICE-RA), Slice Priority (SLICE-PRIO), User category (USER-CAT) (if applicable). Upon receipt of a service/slice instantiation request message from the PPM 204, the SLHM 205 or the SLOM 206 may perform necessary actions to instantiate the service/slice.

In the case of service instantiation, the SLHM 205 may perform actions such as communicating with RORM 203 for determining appropriate resources for the service, allocating the resources for the service as determined by RORM 203, setting up end-to-end path for the service traffic to flow (this may include configuring Service Function Chains), making necessary adjustments (if needed) to other services (altering the flows, modifying resource allocation, etc.), etc. Similarly, in the case of slice instantiation, the SLOM 206 may perform actions such as communicating with RORM 203 for determining appropriate resources for the slice sub-net(s), allocating resources for the slice sub-net as determined by the RORM 203, instantiating the slice sub-net(s), forming an end-to-end slice with an appropriate combination of slice sub-net(s), enforcing policy rules in case of shared slice sub-net(s) (shared slice sub-nets are those which are shared across multiple end-to-end network slices), etc.

The SLHM 205 or SLOM 206 may then send a request to the DCAOM 201 to determine the appropriate monitoring, data collection, aggregation and analysis to be done for the service/slice respectively. The SLHM 205 or SLOM 206 may pass the inputs received from the PPM 204 along with the resource details (RES-DET) in the request sent to the DCAOM 201.

Figure 6:
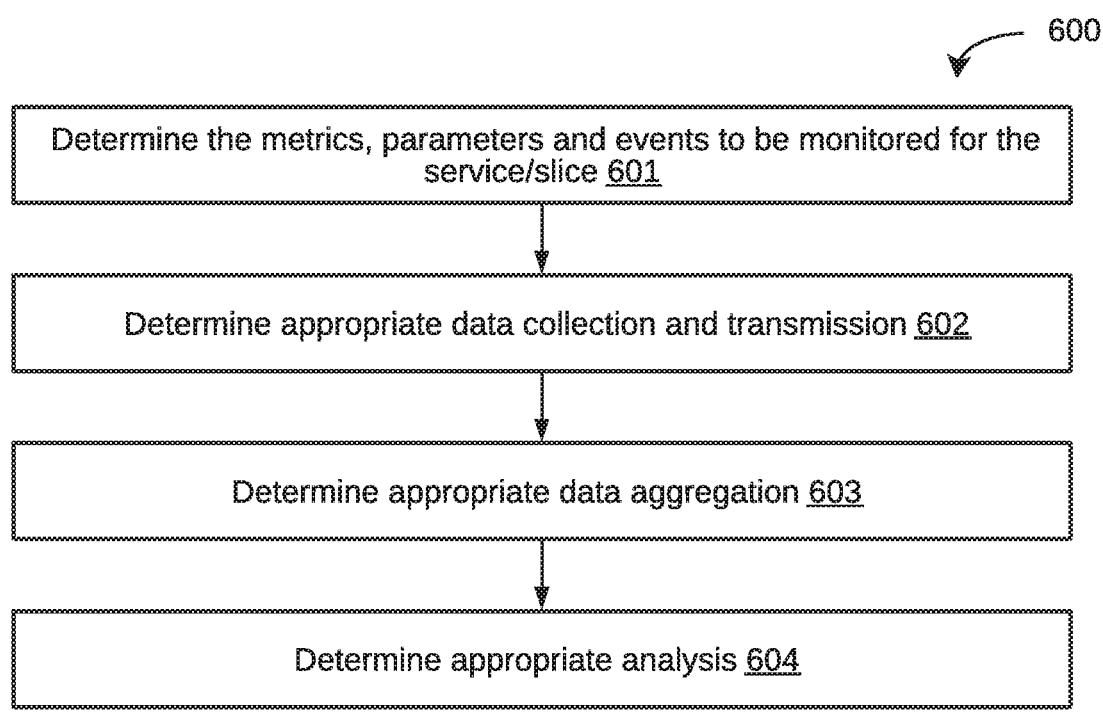
FIG. 6 is a flow diagram of an exemplary process for appropriate data collection, aggregation and analysis for a service/slice, in accordance with some embodiments of the present disclosure.

Upon receiving a request from the SLHM 205 or SLOM 206, at step 507, the DCAOM 201 may invoke a sub-process for determination of appropriate data collection, aggregation and analysis for a service/slice so as to determine the appropriate monitoring context for the service/slice. Referring now to FIG. 6, exemplary control logic 600 for determination of appropriate data collection, aggregation and analysis for the service or the network slice is depicted, via a flowchart, in accordance with some embodiments of the present disclosure. As illustrated in the flowchart, the control logic 600 may include the steps of determining the metrics, parameters and events to be monitored for the service/slice at step 601, determining appropriate data collection and transmission at step 602, determining appropriate data aggregation at step 603, and determining appropriate analysis at step 604.

At step 601, the DCAOM 201 determines what needs to be monitored for the service/slice (metrics, parameters, events, etc.) as follows:

(a) Fetch the information to be monitored for the service/slice from the SERV-MON-PARAMS-TABLE/SLICE-MON-PARAMS-TABLE based on the service/slice KPIs, access network type, user category, etc. The information in SERV-MON-PARAMS-TABLE/SLICE-MON-PARAMS-TABLE may contain mandatory parameters (MAND-MON-SERV-PARAMS/MAND-MON-SLICE-PARAMS) to be monitored, and conditional parameters (COND-MON-SERV-PARAMS/COND-MON-SLICE-PARAMS), i.e., parameters to be monitored when certain conditions/rules are met.

(b) The DCAOM 201 may determine which COND-MON-SERV-PARAMS/COND-MON-SLICE-PARAMS need to be monitored by checking which of the conditions are fulfilled. Such determination may include checking access network type (e.g., Wi-Fi, 4G access, 5G New Radio, mmwave), dynamic network conditions (e.g., resource occupancy levels), location and environment factors (e.g., whether the service is offered in an open insecure location), user characteristics (e.g., highly mobile user, platinum subscriber), other services/slices that are active in the same location (which could have a potential impact on the new service/slice being instantiated), etc. For example, COND-MON-SERV-PARAMS may include monitoring queue occupancy in the RAN nodes (eNodeB/gNodeB/Wi-Fi Access Point, etc.) and core nodes (user plane function (UPF), packet data network gateway (PGW), etc.) if the resource occupancy levels in the RAN and core are greater than a pre-configured threshold.

(c) The DCAOM 201 may then form SERV-MON-PARAMS-LIST/SLICE-MON-PARAMS-LIST for the service/slice with the information determined above, as well as the priority of each item to be monitored. The priority may be determined from the priority value fetched from SERV-MON-PARAMS-TABLE for that specific item and policy rules.

At step 602, The DCAOM 201 may determine appropriate data to be collected and transmitted as described below:

(a) For each entry in SERV-MON-PARAMS-LIST/SLICE-MON-PARAMS-LIST, the DCAOM 201 may determine the data to be collected using the mapping rules present in MON-PARAMS-DCM-TABLE, and may form DATA-COLL-LIST. For example, to monitor the end-to-end latency for a service, packet timestamp data in access network, transport network (fronthaul, backhaul), and core network may be required to be collected. Similarly, to monitor total packets dropped by the network, either packet drop data in each network segment may be required to be collected, or at least the number of packets received at the entry point of the network (access network in case of uplink packets, gateway or firewall for downlink packets) and those sent at the exit point of the network may be required to be collected.

(b) The DCAOM 201 may then determine the appropriate node(s) in the network from where the data should be collected as follows:
  (i) For each entry (DATA-COLL-ITEM) in DATA-COLL-LIST, the DCAOM 201 may determine the possible places where the data can be collected using DATA-COLL-SRC-TABLE and factors such as access type used for the service/slice, policy constraints, etc., and form a DATA-COLL-POSS-NODE-LIST for that DATA-COLL-ITEM.
  (ii) The DCAOM 201 may sort the DATA-COLL-LIST based on the priority of the DATA-COLL-ITEMs.
  (iii) The DCAOM 201 may perform the following actions for each DATA-COLL-ITEM in DATA-COLL-LIST, starting from the DATA-COLL-ITEM with the highest priority:
    For each entry in DATA-COLL-POSS-NODE-LIST for a DATA-COLL-ITEM, the DCAOM 201 may determine the network segment or network sub-segment and identity of the node. Further, the DCAOM 201 may check if the node has capability to collect data by checking NODE-CAPAB-TABLE. If the capability does not exist, then the DCAOM 201 may remove the node from the DATA-COLL-POSS-NODE-LIST for the DATA-COLL-ITEM.
    For each entry in the DATA-COLL-POSS-NODE-LIST for a DATA-COLL-ITEM, the DCAOM 201 may perform the following:
      The DCAOM 201 may determine the reliability level (REL-LEVEL) of the node (e.g., on a scale of 1-5) for effective data collection. This may be determined based on historical data depending on the proportion of the instances when data was missing (not collected and/or not reported), inconsistent, not provided in time (e.g., if a node collected data effectively and provided it in a timely manner greater than 99% of the time, REL-LEVEL would be 5, and at the other extreme, if the node provided proper data less than 70% of the time, REL-LEVEL would be 1).
      The DCAOM 201 may determine support for seamless handover mechanism (HO-SUPP-LEVEL) for data collection. This may include appropriate signaling mechanisms, collecting data for a short duration after the user is handed over, etc. HO-SUPP-LEVEL could be determined on a scale of 1-3: value 1 means none or minimal support, value 3 means full support for seamless handover.

The DCAOM 201 may obtain the mobility levels of the users to whom the service will be offered (MOB-LEVEL), based on historical data as well as from the user profile (e.g., 1—no or walking mobility, 2—mobility speeds less than 60 kmph, 3—mobility speeds greater than 60 kmph). Further, based on determined MOB-LEVEL, the DCAOM 201 may determine the MOB-MAPPING-LEVEL for the node (on a scale of 1-3) using MOB-MAPPING-TABLE. For example, if MOB-LEVEL is 1, then MOB-MAPPING-LEVEL may be 3 for eNodeB, gNodeB, PGW and UPF; if MOB-LEVEL is 3, the MOB-MAPPING-LEVEL would be 1 for enodeB and gNodeB, 2 for UPF, 3 for PGW. In other words, MOB-MAPPING-LEVEL is an indicator of the node being able to continue data collection in the presence of mobility, without any significant overheads introduced due to the mobility.

The DCAOM 201 may determine the security level (SEC-LEVEL) on a scale of 1-3 (e.g., an AP placed in a public location may be less secure (value 1) than a router placed in a private data center (value 3)), based on history of security exceptions. This may be determined from policy inputs (provisioned by operator) and/or historical data based on the actual location of the node, and security exceptions encountered in the past.

The DCAOM 201 may determine FITNESS-LEVEL as a function of REL-LEVEL, HO-SUPP-LEVEL, MOB-LEVEL, SEC-LEVEL. It should be noted that the FITNESS-LEVEL may be determined as a simple function which computes the weighted average of the 4 parameters, or it could use complex algorithms and additional factors such as service priority.

The DCAOM 201 may store the FITNESS-LEVEL for each node and select the node with the highest FITNESS-LEVEL and update the node (DATA-COLL-NODE) in DATA-COLL-NODE-LIST. If the FITNESS-LEVEL of none of the nodes is greater than a certain threshold (FITNESS-THRES), then the DCAOM 201 may determine if any of the nodes removed due to resource unavailability earlier has FITNESS-LEVEL greater than FITNESS-THRES. For those nodes newly determined to have FITNESS-LEVEL greater than FITNESS-THRES, the DCAOM 201 may determine if the data collection for another DATA-COLL-ITEM of this service/slice (if not, of any other service/slice, starting with the service/slice of lowest priority) may be moved to another node. It should be noted that such determination may include checking for alternative nodes with FITNESS-LEVEL greater than FITNESS-THRES, and, if the data collection is already active, then checking feasibility of handover of the data collection function and initiating steps for handover, checking impact if any on data aggregation and analysis and addressing those impacts (e.g., allocating higher bandwidth for transmission from the data collecting node to the aggregating node), checking policy constraints, etc.

The DCAOM 201 may form DATA-COLL-NODE-LIST containing the list of nodes determined above so as to perform data collection for the service/slice, along with the data to be collected by each node (together with the granularity and frequency).

The DCAOM 201 may then determine which DOM-DCAOMs 308 have to be contacted for configuring data collection by looking up the network segment where each node in DATA-COLL-NODE-LIST for the service/slice is located, and the DOM-ORCH 300 that controls the network segment. The DCAOM 201 may then send a request to the relevant DOM-DCAOM(s) 308 in one or more DOM-ORCH(s) 300 determined above, to determine the exact location and instance of the nodes to perform the data collection for the service/slice. The DCAOM 201 may pass relevant details (i.e., details applicable to the network segment under the control of the particular DOM-ORCH 300) from the DATA-COLL-NODE-LIST (as DATA-COLL-NODE-SUB-LIST), along with the priority of each item to be collected in that network segment for the service/slice.

Upon receiving a request from the DCAOM 201 to determine the appropriate nodes for data collection, the DOM-DCAOM 308 may perform the following actions:

(a) For each node in DATA-COLL-NODE-SUB-LIST, the DOM-DACOM 308 may determine the active instances of the node (within that slice sub-net), their respective resource occupancy levels (storage, compute and networking) and their feasibility to scale up.

(b) The DOM-DACOM 308 may form a list of instances (INST-LIST) whose resource occupancy levels less than RESOURCE-OCCUP-THRES and keep only those instances that have sufficient resources (storage, compute and networking) to collect the required data at the required granularity and frequency (either as is or after scaling).

(c) The DOM-DACOM 308 may determine the most appropriate node form the available instance in INST-LIST after step (b), as follows:

(c1) In case of a new service instantiation:
 (i) The DOM-DACOM 308 may choose the instance (if any present), that is already part of the service flow, and stop further processing, for that particular node.
 (ii) If step (i) was not successful, the DOM-DACOM 308 may choose the instance (if any present) whose distance from the location/network sub-segment where the service(s) is being delivered is the minimum.
 (iii) If steps (i) and (ii) don't result in any instance being chosen, the DOM-DACOM 308 may determine the closest place (i.e., at minimum distance) from the location/network sub-segment where the service is being delivered to create a new instance of the node (such determination involves checking feasibility, availability of resources, etc.).

(c1) In case of a new slice subnet instantiation:
 (i) The DOM-DACOM 308 may choose the instance (if any present), that is already part of the slice subnet.
 (ii) If step (i) didn't result in any instance being chosen, the DOM-DACOM 308 may determine the closest place (i.e., at minimum distance) from the center of the slice sub-net (in terms of geographical distance) to create a new instance of the node. It should be noted that such determination may involve checking feasibility, availability of resources, etc.

The DOM-DCAOM 308 may then send details of the node instances chosen for performing the data collection for each entry in DATA-COLL-NODE-SUB-LIST (that it received from the DCAOM 201) to the DCAOM 201.

At step 603, the DCAOM 201 may determine the appropriate data aggregation to be done for the service/slice as described below:

(i) Using SERV-MON-PARAMS-LIST/SLICE-MON-PARAMS-LIST for the service/slice determined at step 601, the DCAOM 201 may determine the data to be aggregated for the service/slice from DATA-AGGREG-TABLE and the constituent DATA-COLL-ITEM(s) needed for the aggregation. The DCAOM 201 may form DATA-AGGREG-LIST with the list of data items to be aggregated (DATA-AGGREG-ITEM) and the constituent DATA-COLL-ITEM(s).

(ii) For each DATA-AGGREG-ITEM, the DCAOM 201 may determine the possible nodes which can perform the data aggregation using DATA-AGGREG-SRC-TABLE and form a DATA-AGGREG-POSS-NODE-LIST for that DATA-AGGREG-ITEM.

(iii) The DCAOM 201 may sort the DATA-AGGREG-LIST based on the priority of the DATA-AGGREG-ITEMs.

(iv) For each DATA-AGGREG-ITEM in DATA-AGGREG-LIST, starting from the DATA-AGGREG-ITEM with the highest priority, the DCAOM 201 may perform following actions:

(a) For each entry in DATA-AGGREG-POSS-NODE-LIST for a DATA-AGGREG-ITEM, the DCAOM 201 may determine the exact location and identity of the node (DATA-AGGREG-POSS-NODE). The DCAOM 201 may determine if the DATA-AGGREG-POSS-NODE has sufficient resources (storage, compute and networking) to aggregate the required data at the required frequency. If DATA-AGGREG-POSS-NODE does not have sufficient resources (i.e., resources are less than DATA-AGGREG-THRES), then the DCAOM 201 may remove the node from DATA-AGGREG-POSS-NODE-LIST.

(b) The DCAOM 201 may determine the distances from each of the DATA-COLL-NODE(s) (network segment level or particular instance level if feasible) responsible for providing the DATA-COLL-ITEM(s) for that DATA-AGGREG-ITEM. The DCAOM 201 may determine the network conditions in the intervening path between the DATA-COLL-NODE(s) for the DATA-COLL-ITEM(s) and the DATA-AGGREG-POSS-NODE.

(c) The DCAOM 201 may determine the estimated delay (EST-DELAY) and probability of timely data reaching the DATA-AGGREG-POSS-NODE (PROB-TIMELY-DELIV). EST-DELAY may be transmission time computed as a function of distance and network conditions. The function may first determine the transmission time based on distance and bandwidth, and then apply a scaling factor based on resource occupancy level in the network (congestion level, processor overload, etc.). PROB-TIMELY-DELIV may be determined based on historical data corresponding to the network conditions (e.g., a congestion level greater than 50% may indicate a 75% probability of data not reaching on time).

(d) The DCAOM 201 may shortlist all DATA-AGGREG-POSS-NODEs whose weighted product of EST-DELAY and PROB-TIMELY-DELIV is greater than AGGREG-THRES.

(e) From the nodes shortlisted in Step (d), the DCAOM 201 may determine the DATA-AGGREG-NODE based on the optimum overhead with respect to storage and bandwidth in the DATA-COLL-NODE(s) and the DATA-AGGREG-NODE and in the intervening network segments/paths. It should be noted that storage overheads may also result due to delay in transmission, delay in receiving one or more DATA-COLL-ITEM(s) required for aggregation, etc. Similarly, bandwidth overheads may be due to following a circuitous path.

If in Step (d), no nodes fulfill the threshold criteria, the DCAOM 201 may determine if any of the nodes removed from DATA-AGGREG-POSS-NODE-LIST in Step (a) fulfill the criteria. If one or more such removed nodes fulfill the criteria, the DCAOM 201 may then determine the possibility of re-assignment of DATA-AGGREG-NODE for another DATA-AGGREG-ITEM using that node for the same service/slice first, and if not found, for another active service/slice, starting from the service/slice of lowest priority. It should be noted that such determination may include checking for alternative nodes with PROB-TIMELY-DELIV greater than AGGREG-THRES, and, if the data aggregation is already active, then checking feasibility of handover of the data aggregation function and initiating steps for handover, checking impact if any on data analysis and addressing those impacts (e.g., allocating higher bandwidth for transmission from the data aggregating node to the analysis node), checking policy constraints, etc.

It should be noted that the optimization in Step (e) may be also carried out as a global optimization, i.e., to optimize the sum of overheads for all DATA-AGGREG-ITEMs rather than optimize the overheads for each DATA-AGGREG-ITEM.

Further, it should be noted that, during the determination of appropriate data aggregation done as described above, in case the DCAOM 201 determines only the node(s) (and not the specific instance(s)) where data aggregation has to be performed, the DCAOM 201 may request the DOM-DCAOM 308 to determine the exact instance of the node where data aggregation should be performed. The DOM-DCAOM 308 may determine this based on resource availability in the various instances, distance from the DATA-COLL-NODE(s), necessity for scaling (based on resource availability in already active instances and distance from DATA-COLL-NODE(s)), and may send back the information of the instance(s) to the DCAOM 201.

At step 604, the DCAOM 201 may inform the DADM 202 of the service/slice being activated along with the DATA-COLL-ITEMs and DATA-AGGREG-ITEMs. The DADM 202 may determine what analysis has to be performed using DATA-ANALY-TABLE (accessing it with the KPIs associated with the service/slice and the service/slice priority and user category). Subsequently, the DADM 202 may determine where the analysis has to be performed and the sequence of analysis for the aggregated information, using orchestration of cognitive functions for SLA maintenance. The orchestration of CFs for SLA maintenance is described in co-pending Indian Patent Application No. 201841046658 (U.S. patent application Ser. No. 16/358, 751) by the Applicant, the contents of which are incorporated herein in their entirety by reference.

The DADM 202 may then determine the minimum accuracy level of the analysis required (MIN-ANALY-ACCU-LEVEL) for each set of data items to be analyzed based on historical data (ANALY-ACCU-LEVEL-TABLE). Based on this, the DADM 202 may then determine the waiting time for data inputs and allowed number of missing/inconsistent data. The DADM 202 may also determine the granularity of analysis and the frequency of analysis as described below:

(a) The DADM 202 may first determine the granularity and frequency using the GRAN-FREQ-ANALY-TABLE below:

| Service/Slice Priority | Served User Category | Granularity of Analysis | Frequency of Analysis |
|---|---|---|---|
| High | High (Premium) | Fine-grained | Maximum |
| High | Medium (Normal) | Medium | Maximum |
| Medium | High (Premium) | Medium | Maximum |
| Medium | Medium | Medium | Medium |

(b) The DADM 202 may map the determined granularity to the appropriate level of analysis (e.g., fine-grained queue buildup analysis may be done on a per queue basis for fine-grained analysis, per set of queues for medium-grained analysis, and at network element/node level for coarse-grained analysis). It should be noted that such a mapping may be done based on provisioned inputs.

(c) The DADM 202 may also determine the analysis priority (ANALY-PRIO) based on the service/slice priority, and the key KPIs for the service/slice. It should be noted that, in case of resource constraints or deadline constraints, the analysis of those items whose ANALY-PRIO is highest may be performed first.

The DCAOM 201 or the DADM 202 may then share the details of the nodes/instances where data collection, aggregation and analysis are to be performed for a particular service/slice, along with the granularity and frequency to the SLHM 205 or SLOM 206. If during the above steps, the node where data collection, aggregation or analysis for another service/slice is changed, the DCAOM 201 or the DADM 202 may pass this information to the SLHM 205 or SLOM 206. Additionally, the DCAOM 201 or the DADM 202 may collect data (at its level) as well as may aggregate the data received from the DOM-DCAOMs 308 on the effectiveness of the data collection, aggregation and analysis.

Upon determination of the appropriate monitoring context for the service/slice by DCAOM 201 and DADM 202, at step 508, the SLHM 205 or the SLOM 206 may invoke another sub-process for activation of data collection, aggregation and analysis so as to activate the data collection, aggregation and analysis for the service/slice. The DCAOM 201 and the DADM 202 may activate data aggregation and analysis of those items which must be aggregated and/or analyzed by a DOM-ORCH 300 or the E2E-ORCH 200. The DCAOM 201 may then send a request to the DOM-DCAOMs 308 of the relevant DOM-ORCHs 300 to activate the data collection and aggregation within the network segment controlled by that DOM-ORCH 300. The DADM 202 may then send a request to the DOM-CONF 306 of the relevant DOM-ORCHs 300 to activate the data analysis within the network segment controlled by that DOM-ORCH 300. The DOM-CONF 306 may, in turn, activate the data analysis in the relevant network functions controlled by the DOM-ORCH 300, including the DOM-DATAM 310 in the DOM-ORCH 300 itself.

The DOM-DCAOM 308 may determine the priority, criticality and frequency of transmission from DATA-TRANS-PCF-TABLE. Based on the priority, the DOM-DCAOM 308 may assign appropriate guaranteed bandwidth in DATA-COLL-NODE to transfer the collected data in a timely manner. Based on the criticality, the DOM-DCAOM 308 may assign appropriate mechanism of error control, retransmission and buffering. Based on the frequency of transmission, the DOM-DCAOM 308 may assign appropriate storage and allocates bandwidth periodically. The DOM-DCAOM 308 may also determine the granularity of information to be transmitted under normal and resource-constrained conditions from GRAN-TABLE using priority and criticality of the DATA-COLL-ITEM. The DOM-DCAOM 308 may then pass all the information determined above to the node instances performing the data collection and aggregation. The DOM-DCAOM 308 may also collect metrics from the nodes performing data collection, aggregation and analysis on the effectiveness (via the DOM-MONIM 307), for e.g., number of occurrences of missed data collection, late transmission of collected data, etc., and the reasons for such occurrences. The DOM-DCAOM 308 may pass the collected information periodically or upon occurrence of any alarm/exception (e.g., failure to collect data) to the DCAOM 201.

At step 509, the SLHM 205 or SLOM 206 may initiate monitoring of the service/slice by sending a request to the respective DOM-ORCHs 300 (which, in turn, may send a request to the determined data collection, aggregation and analysis nodes), as well as the effectiveness of the data collection, aggregation and analysis by instructing the DCAOM 201 and the DADM 202.

At step 502, the nodes/NEs activated in step 508 may collect data, aggregate data, analyze data for the active service(s)/slice(s). The DCAOM 201 as well as the DOM-DCAOMs 308 may request MONIM 208 to perform monitoring of the effectiveness of the data collection, aggregation and analysis. This may involve keeping track of number of times data was not collected or reported on time (reported by the aggregation node) (along with the reason, e.g., processor overload, insufficient bandwidth, node outage), number of times data was not aggregated properly (reported by the analysis node) (along with the reason, e.g., missing data inputs, processor overload, handover failure), number of times data was not analyzed in time and/or sufficiently (reported by the analysis node or by the DADM 202) (along with the reason). The MONIM 208 may, in turn, request the DOM-MONIMs 307 to perform monitoring within the respective network domains, and send the monitored data to the MONIM 208.

At step 503-1, during the monitoring, the FPPM 209 may detect or predict a fault/performance issue in one or more services and/or slices. In some embodiments, the FPPM 209 may detect such issues by simple observation of threshold crossing or parameter values. Further, in some embodiments, the FPPM 209 may predict such issues using techniques such as KPI trend analysis or complex algorithms and machine learning techniques on the monitored data for the service/slice. The FPPM 209 may use the help of other cognitive functions (CFs) in the network to perform such an analysis. During the analysis, if additional information is required to be collected or aggregated (in terms of additional data, granularity and/or frequency), the FPPM 209 may send a request to the DCAOM 201 for the same. The DCAOM 201 may then determine the changes to the data collection, aggregation and analysis done for the service(s)/slice(s), and may send a request to the relevant DOM-ORCHs 300 to carry out the determined changes.

At step 503-2, during the monitoring (of network, users, active services and slices, exceptions, etc.), the DCAOM 201 may be informed of one or more of the following by the MONIM 208: change in network conditions (e.g., thresholds crossed, change in access network type), change in service characteristics (e.g., video added to an earlier audio-only session), change in user characteristics (e.g., mobility), change in location (open to in-building, public place, etc.), fault/performance issue in the node performing data collection and aggregation, service KPI degradation due to data collection and aggregation, etc. Similarly, the DOM-DCAOM 308 may be informed of one or more of the following by the DOM-MONIM 307: change in network conditions (e.g., thresholds crossed, change in access network type) within the network segment, change in service characteristics (e.g., video added to an earlier audio-only session), change in user characteristics (e.g., mobility), change in location (open to in-building, public place, etc.), fault/performance issue in the node performing data collection and aggregation within the network segment, service KPI degradation due to data collection and aggregation in scenarios where the service KPIs are relevant for the network segment alone (e.g., access network delay) or where a service is rendered entirely within that network segment, etc.

The DCAOM 201 or the DOM-DCAOM 308 may then determine if a change in the monitoring context is required, i.e., any change in the configuration of the data collection, aggregation and/or analysis has to be done for one or more service(s) or slice(s). The DCAOM 201 or the DOM-DCAOM 308 may determine this if one or more of the following conditions are met:
  (a) Change in network conditions (e.g., resource occupancy levels), service context (e.g., location of the service, access network used, service characteristics used, security/privacy exceptions encountered), or user context (e.g., user mobility, change in end-user device) may require a changed set of parameters to be monitored based on pre-defined rules specified in COND-MON-SERV-PARAMS, COND-MON-SLICE-PARAMS.
  (b) Number of exceptions or performance level of the data collection, aggregation and analysis of the involved nodes may cross thresholds (EFF-THRES).
  (c) KPI adherence level of one or more KPIs of the service/slice to the target service/slice KPIs (TARGET-SERV-KPIs/TARGET-SLICE-KPIs) may be below threshold (KPI-ADHER-LVL-THRES).

At step 504-1, the FPPM 209 may inform (using a REST call or message interface) the SLHM 205 or the SLOM 206 to initiate preventive/corrective actions for the service/slice respectively for the identified fault/performance. The SLHM 205 or the SLOM 206 may then invoke the FPIRM 210. The FPIRM 210 may, in turn, invoke appropriate cognitive functions or analytics modules to determine appropriate resolution actions. Such resolution actions may include scaling up the resources, re-assignment of resources, changing traffic flow paths, making modifications to other service(s)/slice(s), increasing the security level, etc. During determination of the resolution, the FPIRM 210 may require additional data in terms of additional data items, or existing data items with higher granularity and/or frequency. In such as case, the FPIRM 210 may send a request to the DCAOM 201, which, in turn, may determine the changes needed to the data collection, aggregation and analysis, and may initiate the necessary re-configuration with the help of the DOM-ORCHs 300.

Upon receiving a request to perform a re-configuration of the data collection, aggregation and analysis for one or more services or slices, at step 504-2, the DCAOM 201 may first determine if there is any change in the parameters to be monitored for a service/slice using COND-MON-SERV-PARAMS and COND-MON-SLICE-PARAMS in SERV-MON-PARAMS-TABLE and SLICE-MON-PARAMS-TABLE respectively, based on the change inputs (change in service characteristics, change in network conditions, etc.) received from the FPIRM 210, the SLHM 205, or the SLOM 206. For the impacted data items alone, the DCAOM 201 may apply the sub-process described at step 507 (i.e., the control logic 600) and may inform the SLHM 205 or the SLOM 206. The SLHM 205 or the SLOM 206 may then initiate re-configuration using the sub-process described at step 508 for the impacted items alone.

Based on the inputs received from the MONIM 208, the DCAOM 201 may determine which nodes need to be re-configured for data collection, aggregation or analysis. It should be noted that such a re-configuration may also involve moving the data collection to another instance or another node. For example, if the number of exceptions or performance level of the data collection, aggregation and analysis of the involved nodes cross thresholds (EFF-THRES), then the DCAOM 201 may determine the re-configuration to be done. This may be done by applying relevant steps of the sub-process described at step 507 (i.e., the control logic 600) for the impacted data items alone after removing the node(s) which were found to be inefficient. For example, the effectiveness of data collection may be determined as a percentage of the time data was transmitted completely, correctly, and in a timely manner. If the effectiveness of data collection of a node is less than DATA-COLL-EFFECT-THRES over a window of, say, 5 measurement intervals, then it may be necessary to re-assign the data collection function to another node, if the priority of the associated service/slice is greater than PRIO-MIN. The DCAOM 201 may then carry out the relevant steps so as to perform appropriate re-configuration. This may involve gracefully stopping the data collection, aggregation or analysis in the current node performing this function while activating new nodes for data collection, aggregation or analysis. Depending on the need for continuity, previously collected and aggregated data may be shared by the current node with the newly activated node in raw or concise form. This may be ensured by the DCAOM 201 with the help of the DOM-DCAOM 308 by configuring network resources to enable a smooth transfer of data in a timely manner.

When the FPIRM 210 may request the DCAOM 201 to assess need for re-configuration of the monitoring context, the DCAOM 201 may check the performance of the data collection, aggregation and analysis of the parameters associated with a degrading (or degraded) service/slice KPI. For example, if the number of times data collection was not done timely, or if the data collection frequency is not appropriate, or data is not collected at most granular level, the DCAOM 201 may determine a need for re-configuration for those set of parameter(s). The DCAOM 201 may then accordingly perform relevant steps of the sub-process described at step 507 (i.e., the control logic 600) for the impacted data items alone, after adapting the frequency and granularity as needed, and removing the node currently performing the data collection from the candidate list of nodes. During this process, the DCAOM 201 may also request the DOM- DCAOM 308 to make adaptations to the instance(s) of the nodes chosen for data collection or aggregation.

Additionally, the DCAOM 201 may also request the DOM-DCAOM 308 to check and make necessary adaptations to the transmission related parameters for effective monitoring. The DOM-DCAOM 308, in turn, may check number of occurrence of exceptions (e.g., queue size exceeded, buffer overflow, packet error rate, etc.) and may perform appropriate re-configuration (e.g., re-sizing queues (subject to resource availability), changing the transmission link, etc.). Further, the DOM-DCAOM 308 may make adaptations based on the determination of a need for change of instances of the node(s) involved in data collection or aggregation (e.g., an instance going down, getting overloaded, etc.), and may inform the DCAOM 201 accordingly after making such adaptations.

Upon deactivation of the service/slice, at step 505, the EAAM 207 may assess the effectiveness of the monitoring mechanism as follows:

(i) The EAAM 207 may check whether the KPIs of the service/slice was within permissible limits (i.e., allowed range), and may also check the number of occurrences/duration when the exception to the TARGET-SERV-KPIs/TARGET-SLICE-KPIs was not within permissible limits.

(ii) Based on the determination done at step (i) above, the EAAM 207 may perform a root cause analysis by evaluating the monitoring context and may perform various adjustments based on the learning. For example, (a) The EAAM 207 may determine whether the monitoring context was effective, i.e., whether data collection, aggregation and analysis of the parameters underlying the impacted KPIs were effective, e.g., by examining the compliance level of timely data collection, completeness of data collection, timeliness of aggregation, accuracy level of the analysis, etc.

(b) If the EAAM 207 determines one or more steps were not effective for those KPIs which were not within allowed limits, the EAAM 207 may then analyze the performance of the involved nodes for complementary KPIs (which were within allowed limits) (e.g., a complementary KPI for latency could be throughput), and may perform a correlation between the monitoring context effectiveness and the KPI adherence level to the target KPIs.

(c) The EAAM 207 may the prepare a list of ineffectiveness of the monitoring context, along with the impacted KPI list and the extent of the impacts.

(d) For each ineffectiveness in the monitoring context, the EAAM 207 may ascertain if the performance of the concerned data collection/aggregation/analysis nodes was within allowed limits (availability %, timeliness, missed data reporting count, resource occupancy levels, etc.). If the performance was not within permissible limits, the EAAM 207 may adapt the REL-LEVEL of the node accordingly.

(e) For each ineffectiveness in the monitoring context, the EAAM 207 may ascertain if a change in frequency and granularity could have enabled earlier prediction of KPI non-adherence. This may be determined using techniques such as data extrapolation and by performing the same analysis on the extrapolated data for determining the actual KPI and determining when the issue could be detected.

(f) For each ineffectiveness in the monitoring context, the EAAM 207 may determine if the analysis accuracy level was within permissible limits. If it is not within the permissible limits, then the EAAM 207 may determine if the delay in receipt of collected or aggregated data contributed to the accuracy level going down. In case there was delay beyond permissible limits in data transmission, the EAAM 207 may determine the changes in the rules/distance metrics for choosing the appropriate node for data collection/aggregation.

(g) For each ineffectiveness in the monitoring context, the EAAM 207 may check additional events and parameters (based on whatever is available in the nodes and DOM-ORCH 300) for any lead indicators that could have led to better prediction and resolution of the KPI issue. Upon finding one or more such parameters, the EAAM 207 may adapt the SERV-MON-PARAMS-TABLE/SLICE-MON-PARAMS-TABLE in case of service/slice respectively.

(h) The EAAM 207 may also determine if the resource availability thresholds in the nodes that did the data collection, aggregation and analysis needs to be adapted based on the number of outages of those nodes due to resource unavailability, and the resource occupancy levels at the time of initiating data collection, aggregation or analysis.

Thus, the techniques described in the embodiments discussed above provide for dynamic, context-aware and adaptive data collection, aggregation and analysis for effective fault detection or performance anomaly detection and for service KPI maintenance. As described in detail above in conjunction with FIGS. 2-6, in some embodiments, this may be achieved as follows:

a) Performing collection/aggregation of appropriate data at the appropriate collection/aggregation nodes, and transmission of the collected data in appropriate sequence, frequency and granularity to the aggregation nodes. This is realized by the DCAOM 201 (with the help of DOM-DCAOM 308) by determining the data collection and transmission part of the monitoring context based on service/slice context (location and other service/slice characteristics), user context (mobility, user category, and user characteristics), dynamic network conditions, and performance context (service/slice target SLA/KPIs, past fault/performance data, etc.) and determining and performing necessary re-configuration as described in steps 507 (in particular, steps 601 and 602), 503-2, and 504-2.

b) Performing analysis of appropriate data by appropriate analysis nodes at appropriate frequency and in appropriate sequence, accuracy and granularity. This is realized by the DADM 202 by determining the analysis part of the monitoring context (i.e., what data to be analyzed, where and when and in what sequence to analyze, as well as accuracy, granularity and frequency of data analysis) based on dynamic network conditions, slice/service context, user context, and performance context as described in step 604.

c) Minimizing of overhead by performing data collection at appropriate source, appropriate aggregation at appropriate place in the network, and appropriate analysis at the appropriate location, accuracy level, frequency and granularity. This is achieved by the DCAOM 201 and the DADM 202 as described in the control logic 600.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

As will be appreciated by those skilled in the art, the techniques described in the various embodiments discussed above provide for effective data collection, aggregation, and analysis in a distributed heterogeneous communication network (e.g., next-generation communication network) so as to effectively detect fault or performance anomaly and maintain SLA. As will be appreciated, the techniques may be implemented as a component/feature in any orchestrator or orchestration solution for end-to-end orchestration, service/slice orchestration, or domain-specific orchestration, and so forth.

The specification has described system and method for effective data collection, aggregation, and analysis in a distributed heterogeneous communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of collecting, aggregating, and analyzing data in a distributed heterogeneous communication network, the method comprising:
   determining, by an end-to-end orchestration (E2EO) device, impact characteristics with respect to a network slice or a service in a distributed heterogeneous communication network, wherein the impact characteristics comprise at least one of: user characteristics, service characteristics, slice characteristics, network characteristics, or performance characteristics;
   determining, by the E2EO device, one or more collection nodes, one or more aggregation nodes, and one or more analysis nodes within the distributed heterogeneous communication network based on the impact characteristics; and
   activating, by the E2EO device, the one or more collection nodes for collecting data, the one or more aggregation nodes for aggregating the collected data, and the one or more analysis nodes for analyzing the aggregated data, wherein activating each of the one or more collection nodes comprises determining one or more active instances for each of the one or more collection nodes by:
      determining a domain orchestration (DOM-ORCH) device corresponding to a collection node; and
      triggering the DOM-ORCH device to activate the one or more active instances of the collection node based on at least one of a location of the collection node, a resource occupancy level of the collection node, a feasibility of the collection node to scale-up, or involvement of the one or more instances in the service or the network slice.

2. The method of claim 1,
   wherein the network characteristics comprise at least one of a type of access network, a location of the service, an extent of the network slice, and dynamic network conditions;
   wherein the dynamic network conditions comprise at least one of a congestion in a network segment and a resource occupancy level in the network segment;
   wherein the user characteristics comprise at least one of a location of a user, a mobility of the user, a credit limit of the user, a type of user access device, a power level of the user access device, an identification of the user, or a policy with respect to the user;
   wherein the slice or the service characteristics comprise at least one of a type of service, a policy with respect to the network slice or the service, a bandwidth consumed by the network slice or the service, or actual key performance indicators (KPIs) for the network slice or the service; and
   wherein performance characteristics comprise at least one of environmental factors, target service level agreements (SLAs) for the network slice or the service, target KPIs for the network slice or the service, historical fault data, historical performance data, detected or predicted fault or performance issue in the network slice or the service, a resolution for the detected or the predicted fault or performance issue, or degradation in KPIs due to data collection or aggregation.

3. The method of claim 1, further comprising determining the data to be collected by the one or more collection nodes, wherein determining the data to be collected comprises:
   determining a set of parameters to be monitored for the network slice or the service, wherein the set of parameters comprises at least one of a set of metrics, a set of events, or a set of other parameters, and wherein the set of parameters comprises at least one of a set of mandatory parameters to be necessarily monitored and a set of conditional parameters to be monitored upon fulfillment of one or more pre-defined conditions; and determining the data to be collected for the set of parameters to be monitored based on pre-defined mapping rules or adapted mapping rules for data collection.

4. The method of claim 1, wherein determining the one or more collection nodes comprises:

determining a set of possible collection nodes, from among a plurality of nodes, for the data to be collected based on a pre-defined list of data collection sources and a plurality of data collection factors, wherein the plurality of data collection factors comprises at least one of an access type used for the service or the network slice, a set of policy constraints, a frequency for required data collection, or a granularity for the required data collection; and determining the one or more collection nodes from among the set of possible collection nodes based on at least one of a capability or a level of fitness of each of the set of possible collection nodes, wherein the level of fitness is based on at least one of a reliability, a support for handover of data collection, a support for user mobility, or a level of security.

5. The method of claim 1, further comprising determining the data to be aggregated by the one or more aggregation nodes, wherein determining the data to be aggregated comprises:
determining the data to be aggregated for a set of parameters to be monitored, for the network slice or the service, based on pre-defined mapping rules or adapted mapping rules for data aggregation; and wherein determining the one or more aggregation nodes comprises:
determining a set of possible aggregation nodes, from among a plurality of nodes, for the data to be aggregated based on a pre-defined list of data aggregation sources; and determining the one or more aggregation nodes from among the set of possible aggregation nodes based on at least one of:
an availability of resources at each of the set of possible aggregation nodes,
a distance between each of the set of possible aggregation nodes and each of the one or more collection nodes, or
a network condition in an intervening path between each of the set of possible aggregation nodes and each of the one or more collection nodes.

6. The method of claim 1, wherein the collected data is transmitted from the one or more collection nodes to the one or more aggregation nodes in a pre-determined sequence, at a required frequency, and at a required granularity.

7. The method of claim 1, further comprising determining the data to be analyzed by the one or more analysis nodes, wherein determining the data to be analyzed comprises:
determining one or more analyses to be performed; and
determining the data to be analyzed for the one or more analyses based on pre-defined mapping rules or adapted rules for data analysis; and
wherein determining the one or more analysis nodes comprises:

determining the one or more analysis nodes and a sequence of performing the one or more analyses by performing effective orchestration of cognitive functions (CFs).

8. The method of claim 7, further comprising determining at least one of a minimum accuracy level, a granularity, or a frequency of each of the one or more analyses.

9. The method of claim 1, further comprising:
determining a need for change in data collection, aggregation and analysis for the network slice or the service, upon detecting a change in the impact characteristics; and
determining and performing a re-configuration of at least one of the one or more collection nodes, the one or more aggregation nodes, or the one or more analysis nodes for the network slice or the service, upon determining the need for change.

10. The method of claim 1, further comprising:
assessing an effectiveness of the data collection, aggregation and analysis for the network slice or the service; and
performing tuning of at least one of:
pre-defined parameters to be monitored, mapping rules, and thresholds for determining nodes for data collection, aggregation, and analysis;
a frequency of data collection, aggregation, and analysis;
a granularity of data collection, aggregation, and analysis; or
an accuracy of data analysis.

11. A system for collecting, aggregating, and analyzing data in a distributed heterogeneous communication network, the system comprising:
an end-to-end orchestration (E2EO) device comprising:
at least one processor configured to execute a set of instructions for:
determining impact characteristics with respect to a network slice or a service in the distributed heterogeneous communication network, wherein the impact characteristics comprise at least one of: user characteristics, service characteristics, slice characteristics, network characteristics, or performance characteristics;
determining one or more collection nodes, one or more aggregation nodes, and one or more analysis nodes within the distributed heterogeneous communication network based on the impact characteristics; and
activating the one or more collection nodes for collecting data, the one or more aggregation nodes for aggregating the collected data, and the one or more analysis nodes for analyzing the aggregated data, wherein the at least one processor is configured for activating each of the one or more collection nodes by determining one or more active instances for each of the one or more collection nodes by:
determining a domain orchestration (DOM-ORCH) device corresponding to a collection node; and
triggering a domain data collection and aggregation orchestration module (DOM-DCAOM) in the DOM-ORCH device to activate the one or more active instances of the collection node based on at least one of a location of the collection node, a resource occupancy level of the collection node, a feasibility of the collection node to scale-up, or involvement of the one or more instances in the service or the network slice; and at least one computer-readable medium that stores the set of instructions, configuration data, collected data, aggregated data, and analyzed data.

12. The system of claim 11, wherein the at least one processor is further configured for determining the data to be collected by the one or more collection nodes by:
   determining a set of parameters to be monitored for the network slice or the service, wherein the set of parameters comprises at least one of a set of metrics, a set of events, or a set of other parameters, and wherein the set of parameters comprises at least one of a set of mandatory parameters to be necessarily monitored or a set of conditional parameters to be monitored upon fulfillment of one or more pre-defined conditions; and
   determining the data to be collected for the set of parameters to be monitored based on pre-defined mapping rules or adapted mapping rules for data collection.

13. The system of claim 11, wherein the at least one processor is configured for determining the one or more collection nodes by:
   determining a set of possible collection nodes, from among a plurality of nodes, for the data to be collected based on a pre-defined list of data collection sources and a plurality of data collection factors, wherein the plurality of data collection factors comprises at least one of an access type used for the service or the network slice, a set of policy constraints, a frequency for required data collection, or a granularity for the required data collection; and
   determining the one or more collection nodes from among the set of possible collection nodes based on at least one of a capability or a level of fitness of each of the set of possible collection nodes, wherein the level of fitness is based on at least one of a reliability, a support for handover of data collection, a support for user mobility, or a level of security.

14. The system of claim 11, wherein the at least one processor is further configured for determining the data to be aggregated by the one or more aggregation nodes by:
   determining the data to be aggregated for a set of parameters to be monitored, for the network slice or the service, based on pre-defined mapping rules or adapted mapping rules for data aggregation; and
   wherein the at least one processor is configured for determining the one or more aggregation nodes by:
   determining a set of possible aggregation nodes, from among a plurality of nodes, for the data to be aggregated based on a pre-defined list of data aggregation sources; and
   determining the one or more aggregation nodes from among the set of possible aggregation nodes based on at least one of:
   an availability of resources at each of the set of possible aggregation nodes,
   a distance between each of the set of possible aggregation nodes and each of the one or more collection nodes, or
   a network condition in an intervening path between each of the set of possible aggregation nodes and each of the one or more collection nodes.

15. The system of claim 11,
   wherein the at least one processor is further configured for determining the data to be analyzed by the one or more analysis nodes by:
   determining one or more analyses to be performed; and
   determining the data to be analyzed for the one or more analyses based on pre-defined mapping rules or adapted rules for data analysis; and
   wherein the at least one processor is configured for determining the one or more analysis nodes by:
   determining the one or more analysis nodes and a sequence of performing the one or more analyses by performing effective orchestration of cognitive functions (CFs).

16. The system of claim 11, wherein the at least one processor is further configured for:
   determining a need for change in data collection, aggregation and analysis for the network slice or the service, upon detecting a change in the impact characteristics; and
   determining and performing a re-configuration of at least one of the one or more collection nodes, the one or more aggregation nodes, or the one or more analysis nodes for the network slice or the service, upon determining the need for change.

17. The system of claim 11, wherein the at least one processor is further configured for:
   assessing an effectiveness of the data collection, aggregation and analysis for the network slice or the service; and
   performing tuning of at least one of:
   pre-defined parameters to be monitored, mapping rules, and thresholds for determining nodes for data collection, aggregation, and analysis;
   a frequency of data collection, aggregation, and analysis;
   a granularity of data collection, aggregation, and analysis; or
   an accuracy of data analysis.

18. A non-transitory computer-readable medium storing computer-executable instructions for:
   determining impact characteristics with respect to a network slice or a service in a distributed heterogeneous communication network, wherein the impact characteristics comprise at least one of: user characteristics, service characteristics, slice characteristics, network characteristics, or performance characteristics;
   determining one or more collection nodes, one or more aggregation nodes, and one or more analysis nodes within the distributed heterogeneous communication network based on the impact characteristics; and
   activating the one or more collection nodes for collecting data, the one or more aggregation nodes for aggregating the collected data, and the one or more analysis nodes for analyzing the aggregated data, wherein activating each of the one or more collection nodes comprises determining one or more active instances for each of the one or more collection nodes by:
   determining a domain orchestration (DOM-ORCH) device corresponding to a collection node; and
   triggering the DOM-ORCH device to activate the one or more active instances of the collection node based on at least one of a location of the collection node, a resource occupancy level of the collection node, a feasibility of the collection node to scale-up, or involvement of the one or more instances in the service or the network slice.

* * * * *